US009092716B2

(12) United States Patent
Sato et al.

(10) Patent No.: US 9,092,716 B2
(45) Date of Patent: Jul. 28, 2015

(54) PRINTING APPARATUS HAVING A MEDIUM CONVEYING UNIT

(71) Applicant: Oki Data Corporation, Minato-ku, Tokyo (JP)

(72) Inventors: Daichi Sato, Tokyo (JP); Seiichi Satake, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/045,044

(22) Filed: Oct. 3, 2013

(65) Prior Publication Data

US 2014/0098389 A1 Apr. 10, 2014

(30) Foreign Application Priority Data

Oct. 5, 2012 (JP) ................................ 2012-223512

(51) Int. Cl.

*G06K 15/00* (2006.01)
*G06K 15/16* (2006.01)
*H04N 1/00* (2006.01)
*B41J 11/20* (2006.01)
*B41J 13/02* (2006.01)
*H04N 1/12* (2006.01)

(52) U.S. Cl.

CPC ................ *G06K 15/16* (2013.01); *B41J 11/20* (2013.01); *B41J 13/025* (2013.01); *H04N 1/00708* (2013.01); *B65H 2220/01* (2013.01); *H04N 1/121* (2013.01)

(58) Field of Classification Search

USPC .......................................................... 399/124
See application file for complete search history.

(56) References Cited

U.S. PATENT DOCUMENTS 6,190,071 B1 * 2/2001 Mochizuki et al. ........... 400/708
7,111,840 B2 * 9/2006 Miyamoto .................... 271/119
2008/0251998 A1 * 10/2008 Muneyasu et al. ............ 271/227
2008/0296828 A1 * 12/2008 Shoji et al. ................. 271/10.12

FOREIGN PATENT DOCUMENTS

JP 02258380 A * 10/1990
JP 2005-231121 A 9/2005
JP 2008-297076 A 12/2008

* cited by examiner

*Primary Examiner* — Miya J Cato
(74) *Attorney, Agent, or Firm* — Panitch Schwarze Belisario & Nadel LLP

(57) ABSTRACT

A printing apparatus includes: a printing head for making printing on a medium; a platen disposed as to face the printing head in a way selectable between being close and being remote from the printing head; a medium conveying unit changeable of a contacting state to the medium for conveying the medium in contact with the medium along a medium conveyance route; a shutter opening and closing the medium conveyance route; a mode selecting unit having plural selectable modes in combination of a choice between being close to and being remote from the platen, the contacting state of the medium conveying unit to the medium, and a choice between closing and opening of the medium conveyance route by means of the shutter; and a controller controlling the mode selecting unit for selecting a prescribed mode from the plural selectable modes.

5 Claims, 35 Drawing Sheets

110 PRINTING APPARATUS
100 MEDIUM CONVEYANCE UNIT
3 FRONT ROLLER PAIR
4 REAR ROLLER PAIR
37 SUB-SCANNING DRIVER
36 MEDIUM CONVEYANCE MOTOR
34 TRACTOR
35 CONTROL-LER
PC 111
8 SHUTTER
39 SCANNING DRIVER
38 SPACE MOTOR
1a CARRIAGE
40 HEAD DRIVER
1 PRINTING HEAD
2 PLATEN
101 PRINTING UNIT
102 MODE CHANGE UNIT
42 MODE CHANGE DRIVER
13 MODE CHANGE MOTOR
18 SLIT DISC
43 TRANS-MISSION SENSOR (a)

| OPERABLE MEMBERS | STATES | MODE |
|---|---|---|
| | | 1 2 3 4 5 6 7 8 9 10 11 12 13 14 15 16 17 18 |
| FRONT ROLLER PAIR | SEPARATING | |
| | CONTACTING | |
| FRONT ROLLER PAIR'S CONTACT PRESSURE | STRONG | |
| | WEAK | |
| SHUTTER | OPEN | |
| | CLOSED | |
| PLATEN | DOWN (OPENING PAPER ROUTE) | |
| | UP (FOR PRINTING) | |
| REAR ROLLER PAIR | SEPARATING | |
| | CONTACTING | |
| REAR ROLLER PAIR'S CONTACT PRESSURE | STRONG | |
| | WEAK | |

PRINTING APPARATUS HAVING A MEDIUM CONVEYING UNIT

CROSS REFERENCE TO RELATED APPLICATION

This application claims priority benefits under 35 USC, section 119 on the basis of Japanese Patent Application No. 2012-223512, the disclosure of which is incorporated herein by reference.

BACKGROUND OF THE INVENTION

1. Field of the Invention

This invention relates to a printing apparatus having a conveying unit for medium.

2. Description of Related Art

Printing apparatuses of prior art may require to adjust a gap amount of a platen to a printing head, to switch distances as well as contacting or non-contacting between the pair of conveyance rollers, and to correct obliquely feeding of the medium, in order to perform printing media of various types such as continuous form sheets and single sheets with high quality Such a printing apparatus may be formed with the printing head mounted thereto and with a gap keeping roller mounted at a carriage travelable in a scanning direction, thereby the carriage pushing down the platen along a slope formed at each end of the platen on which the gap keeping roller travels to switch or adjust the gap amount of the platen to the printing head (see, e.g., Japanese Patent Application Publication No. 2005-231121 (A1)).

Another apparatus of prior art has been known as including two pairs of rollers for conveying a medium, a stopper for correcting obliquely feeding, or skew correction, of the medium, respective arms for rendering the roller pairs contacting or separating, an arm for opening and closing the medium conveyance route with the stopper, and cams of three types for rendering the respective arm pairs contacting or separating and for rendering the stopper opening and closing upon changing arm's positions, respectively, thereby performing switching of contacting or separating of the conveyance roller pair, correcting obliquely feeding of the medium, etc. (see, e.g., Japanese Patent Application Publication No. 2008-297076 (A1)).

SUMMARY OF THE INVENTION

The prior art apparatuses, however, require mechanisms for various actions with respect to each element conveying or holding the medium for making printing on the media of various types with high quality, and therefore, there raises a problem that switching of such mechanisms is also controlled in a complicated manner.

It is therefore an object to provide a printing apparatus solving the above problems with easy control for switching the mechanisms.

In an aspect of the invention, a printing apparatus includes: a printing head for making printing on a medium; a platen disposed as to face the printing head in a way selectable between being close and being remote from the printing head; a medium conveying unit changeable of a contacting state to the medium for conveying the medium in contact with the medium along a medium conveyance route; a shutter opening and closing the medium conveyance route; a mode selecting unit having plural selectable modes in combination of a choice between being close to and being remote from the platen, the contacting state of the medium conveying unit to the medium, and a choice between closing and opening of the medium conveyance route by means of the shutter; and a controller controlling the mode selecting unit for selecting a prescribed mode from the plural selectable modes.

With one preferred embodiment of the invention, the printing apparatus takes an advantage to be capable of easily controlling switching or selecting modes.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 12A to 12C are illustrations showing a front roller gear according to the first embodiment, wherein FIG. 12A is a left side view, FIG. 12B is a front view, and FIG. 12C is a right side view;

FIGS. 13A to 13C are illustrations showing a rear roller gear according to the first embodiment, wherein FIG. 13A is a left side view, FIG. 13B is a front view, and FIG. 13C is a right side view;

FIGS. 14A, 14B are illustrations showing a front camshaft according to the first embodiment, wherein FIG. 14A is a perspective view, and FIG. 14B is a side view;

FIGS. 15A, 15B are illustrations showing a rear camshaft according to the first embodiment, wherein FIG. 15A is a perspective view, and FIG. 15B is a side view;

FIG. 34 is a table showing respective states of the operable portions of the mode change unit with respect to each mode, according to the first embodiment;

DETAILED DESCRIPTION OF EMBODIMENTS

Figure 1:
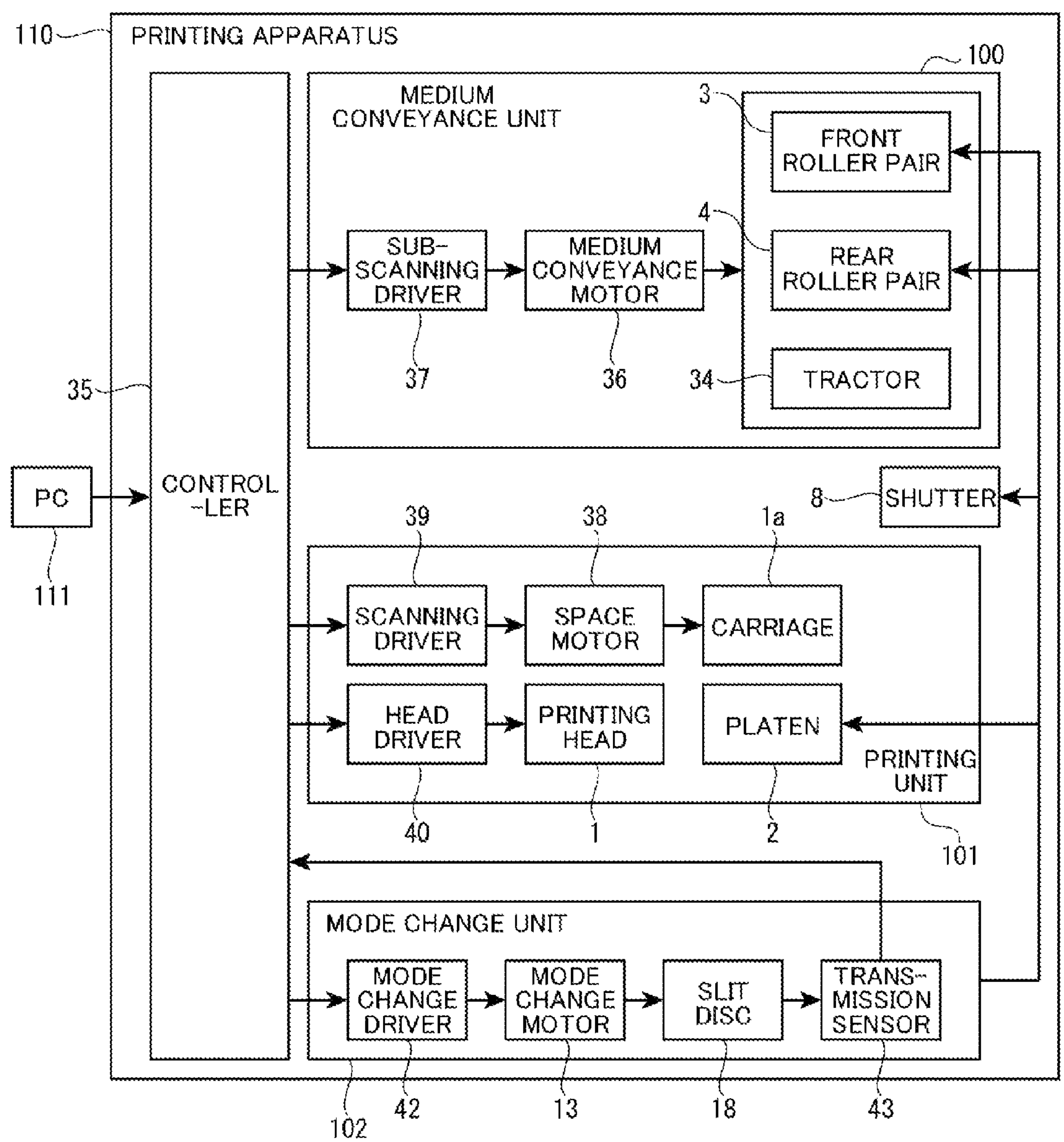
FIG. 1 is a block diagram showing a structure of a printing apparatus according to a first embodiment of the invention.

Hereinafter, referring to the drawings, a printing apparatus according to a first embodiment of the invention is described.

First Embodiment

FIG. 1 is a block diagram showing a structure of the printing apparatus according to the first embodiment. In FIG. 1, the printing apparatus 110 is, e.g., a serial type dot impact printer. In FIG. 1, the printing apparatus 110 includes a controller 35 receiving printing data transmitted from a personal computer (PC) 111 and transmitting signals to respective units in the printing apparatus 110, a medium conveyance unit 100 operable based on signals out of the controller 35 for conveying media, a printing unit 101 for making printing on the media, and a mode change unit 102 serving as a mode selecting unit for performing, in accordance with types of various media and printing conditions, shifting of medium conveyance roller pairs' (i.e., a front roller pair 3 and a rear roller pair 4 in FIG. 3) states of contacting or separating as well as strong or weak contacting pressure, states of a platen 2 shown in FIG. 3 being near to or remote from a printing head 1, and states of the shutter 8 being opening or closing for correcting obliquely feeding upon hitting a front end of the medium in a medium conveyance direction shown in FIG. 3. The printing apparatus 110 does printing upon processing the printing data.

The medium conveyance unit 100 is structured of a sub-scanning driver 37 for driving a medium conveyance motor 36 based on the printing data transmitted from the controller 35, the medium conveyance motor 36 for rotating the front and rear roller pairs 3, 4 serving as the medium conveyance roller pairs and tractors 34, or tract feeders, the front and rear roller pairs 3, 4 disposed astride a conveyance route of a medium 5 for nipping and conveying the medium 5, and the tractors 34 for feeding a sprocket type medium. The medium conveyance unit 100 is formed as selectable of the states of the front and rear roller pairs 3, 4 being contacting or separating and the states of contacting pressure of the front and rear roller pairs 3, 4 being strong or weak. That is, the medium conveyance unit 100 is formed to convey the medium 5 along the medium conveyance route upon contacting to the medium and is structured as changeable of the contacting state to the medium.

The printing unit 101 is constituted of a serial type printing head 1 for printing the medium upon striking an ink ribbon while travelling, a carriage 1*a* for securing the printing head 1, a space motor and a scanning driver 39 for moving the carriage 1*a* in a scanning direction, and a head driver 40 for driving the printing head 1 performing prescribed typing according to the signals from the controller 35.

The mode change unit 102 is structured of a mode change motor 13 serving as a drive source for switching modes described below based on printing data and control signals from the controller 35, a mode change driver 42 controlling the mode change motor 13, a slit disc 18 rotated by drive of the mode change motor 13 serving as a rotary body for detecting a home position mode as a reference position mode for mode changing or mode shifting, and a transmission sensor 43 serving as a reference position mode detecting sensor for detecting the reference position mode upon detecting the position of the slit disc 18 or namely serving as a detecting device for detecting a rotary reference position of a slit or slits formed in the slit disc 18.

The controller 35 selects a prescribed mode among the modes upon controlling the mode change unit 102. The controller 35 also does mode selection according to the medium type to be printed.

Figure 2:
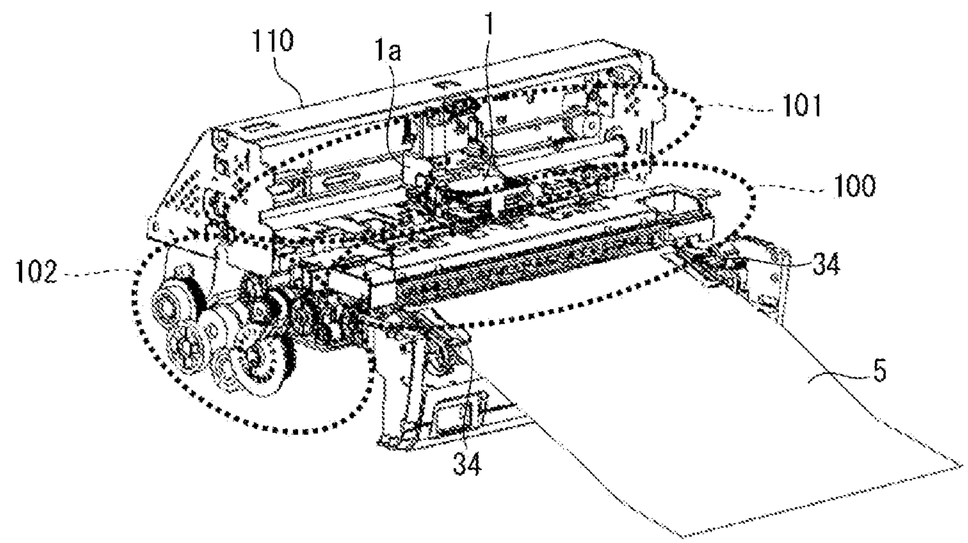
FIG. 2 is a perspective view showing the printing apparatus according to the first embodiment.

FIG. 2 is a perspective view showing the printing apparatus 110 according to the first embodiment. In FIG. 2, the printing apparatus 110 has a switching lever, not shown, for switching the medium to be printed, e.g., between single sheets and continuous form sheets, and where the continuous form sheets are used, the gears are engaged as to transmit the drive to the tractors 34. The printing apparatus 110 includes photoelectric sensors, switches, and the like as a medium type detecting unit for detecting a type of the medium to be printed upon detecting the state of the switching lever.

Figure 3:
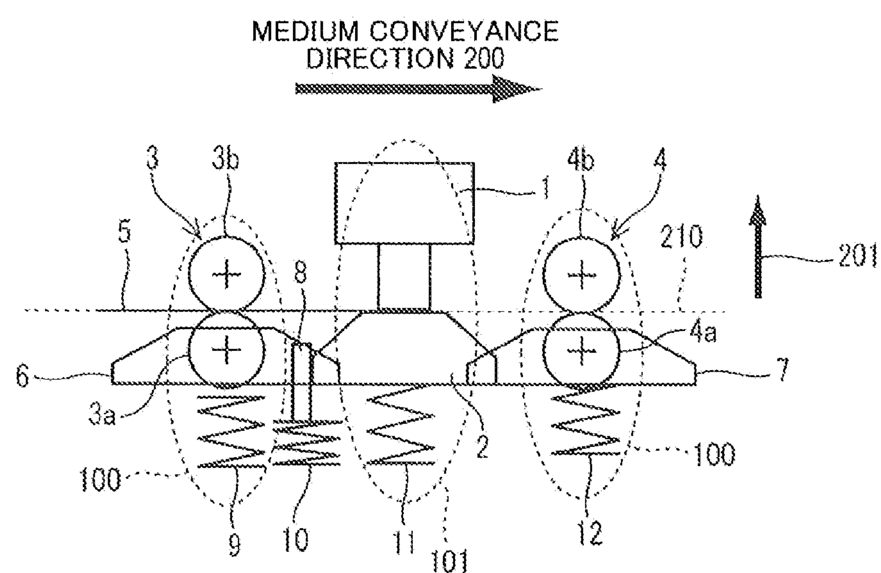
FIG. 3 is a side diagram showing portions of a medium conveyance unit, a printing unit, and a mode change unit according to the first embodiment.

Referring to the drawings, detailed structures of the medium conveyance unit 100, the printing unit 101, and the mode change unit 102, forming the printing apparatus 110, are described next. FIG. 3 is a side diagram showing portions of the medium conveyance unit 100, the printing unit 101, and the mode change unit 102.

In FIG. 3, a direction that the medium 5 is conveyed, or namely a medium conveyance direction is set in a direction of an arrow 200. A front end of the medium, in this specification, means a leading edge of the medium in the medium conveyance direction. A rear end of the medium 5 also means a tailing edge of the medium 5 in the medium conveyance direction.

The printing unit 101 is structured of the serial type printing head 1 travelable in a scanning direction as secured to the carriage 1*a* shown in FIG. 2 for printing the medium 5 via an ink ribbon, the platen 2 arranged as facing the printing head 1 in a manner movable between being close to and being remote from the printing head 1 for holding the medium 5 as well as for receiving strikes given to the medium 5 during printing, and a platen spring or platen springs 11 for urging the platen 2 in a direction of an arrow 201 in FIG. 3, which is substantially perpendicular to the medium conveyance direction.

The medium conveyance unit 100 is structured of the front and rear roller pairs 3, 4 for nipping and conveying the medium 5, a front roller spring or springs 9 for urging the front roller pair 3 in the direction of the arrow 201 in FIG. 3 substantially perpendicular to the medium conveyance direction, a rear roller spring or springs 12 for urging the rear roller pair 4 in the direction of the arrow 201 in FIG. 3 substantially perpendicular to the medium conveyance direction, a gear system, not shown, for transmitting drive force to rotate the front and rear roller pairs 3, 4, the medium conveyance motor 36 shown in FIG. 1, and front and rear sheet guides 6, 7 for smoothly conveying the medium 5.

The mode change unit 102 serving as the mode selecting unit is provided for controlling the shutter 8 serving as a skew correction means for correcting obliquely feeding of the medium by contacting the front end of the medium 5 while, e.g., single sheets are set as the media 5 in a manner switchable between opening and closing the medium conveyance route. A shutter spring or springs 10 are arranged for urging the shutter 8 in the direction of the arrow 201 in FIG. 3 substantially perpendicular to the medium conveyance direction. The mode change unit 102 switches the platen's state between being close to and being remote from the printing head 1, the front and rear pairs' states between contacting and separating as well as of the contacting pressure between being strong or weak, and the shutter's state between closing and opening of the medium conveyance route.

Figure 4:
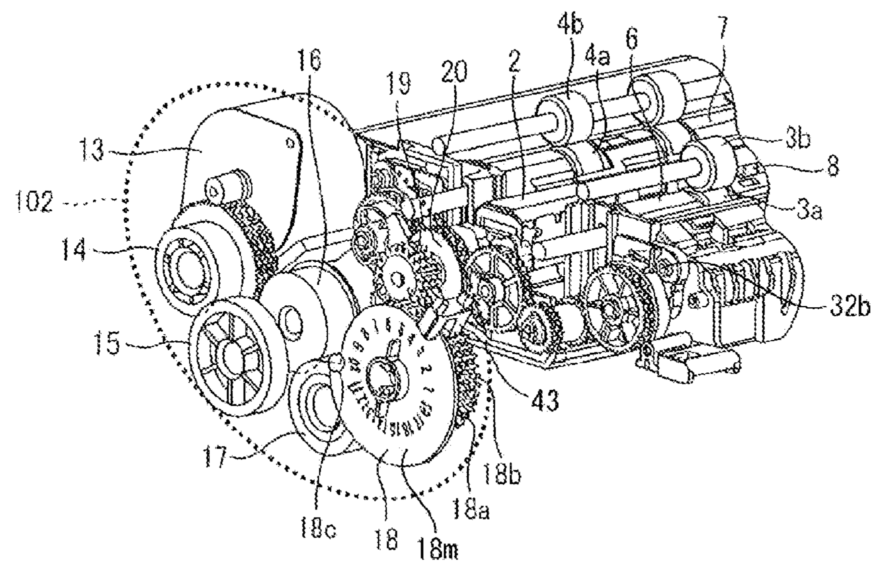
FIG. 4 is a perspective view showing a detailed structure of the mode change unit according to the first embodiment.

FIG. 4 shows a detailed structure of the mode change unit 102 according to the first embodiment. In FIG. 4, the mode change unit 102 is structured of the mode change motor 13 for switching the modes, the slit disc 18 rotated by drive of the mode change motor 13 serving as a rotary body for detecting a home position mode as a reference position mode, idle gears 16, 17 transmitting the drive force from the mode change motor 13 to a slit disc gear surface 18*a* of the slit disc 18, deduction gears 14, 15 for reducing the drive force, and the transmission sensor 43 for detecting the home position mode among the modes.

The slit disc 18 includes a disc member 18*m* in a disc shape having carved numbers from 1 to 18 corresponding to the respective modes. During the operation of the printing apparatus 110, the current mode is indicated by the number located at a prescribed position. The disc member 18*m* has a circumferential edge extending with two different radiuses and slit boundaries 18*c* provided between the longer radius portion and the shorter radius portion. The transmission sensor 43 is made of a photointerrupter for sensing the position of the slit disc 18 by detecting and not detecting a beam transmitting through the slit disc 18 and providing electrical signals. The transmission sensor 43 is arranged at the circumferential edge between the longer and shorter radius portions in the radius direction of the disc member 18*m*, so that the transmission sensor 43 can detect the position of the slit boundary 18*c*. The position at which the transmission sensor 43 detects the slit boundary 18*c* is set as a home position mode, which is an intermediate position of the mode #7 and the mode #8 according to the first embodiment. The slit disc 18, however, does not stop at the position of the home position mode, and, after detecting the home position mode, moves to a position of the prescribed mode such as, e.g., the mode of waiting as described below.

The slit disc 18 further has the gear surface 18*a* and a gear surface 18*b*. The slit disc gear surface 18*a* is in mesh with a gear series transmitting drive from the mode change gear 13. The slit disc gear surface 18*b* is in mesh with a transmission gear 19. A transmission gear 20 coaxially secured to the transmission gear 19 rotates in a united body with the transmission gear 19. The transmission gear 20 meshes various gears having cam surfaces.

Figure 5:
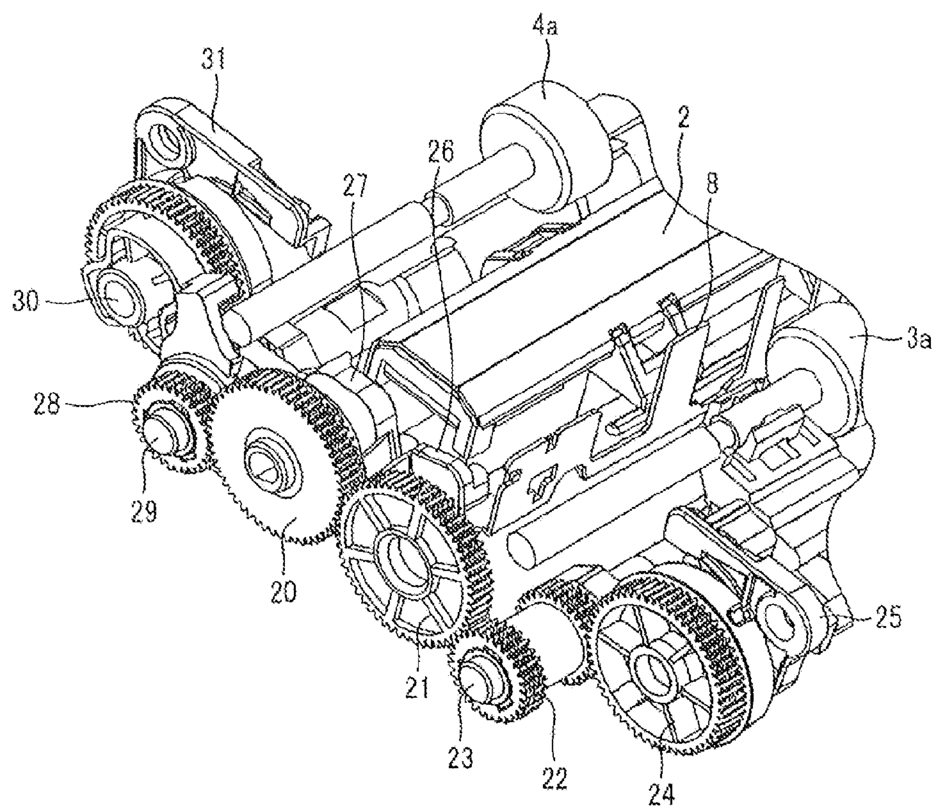
FIG. 5 is a perspective view showing a detailed structure of transmission gears according to the first embodiment.

The mode change unit 102 thus formed rotates various gears having cam surfaces by driving the mode change motor 13 from the controller 35 via the mode change driver 42. Details of various gears are described with reference to FIG. 5. FIG. 5 is a perspective view showing transmission gears according to the first embodiment. In FIG. 5, the transmission gear 20 rotating by drive force from the mode change motor 13 rotates a front roller gear 24 via a transmission gear 21 and a front idle gear 22. The transmission gear 20 also rotates a rear roller gear 30 via a rear idle gear 28. The front idle gear 22 is rotationally supported to a front camshaft 23. The rear idle gear 28 is rotationally supported to a rear camshaft 29.

Figure 6:
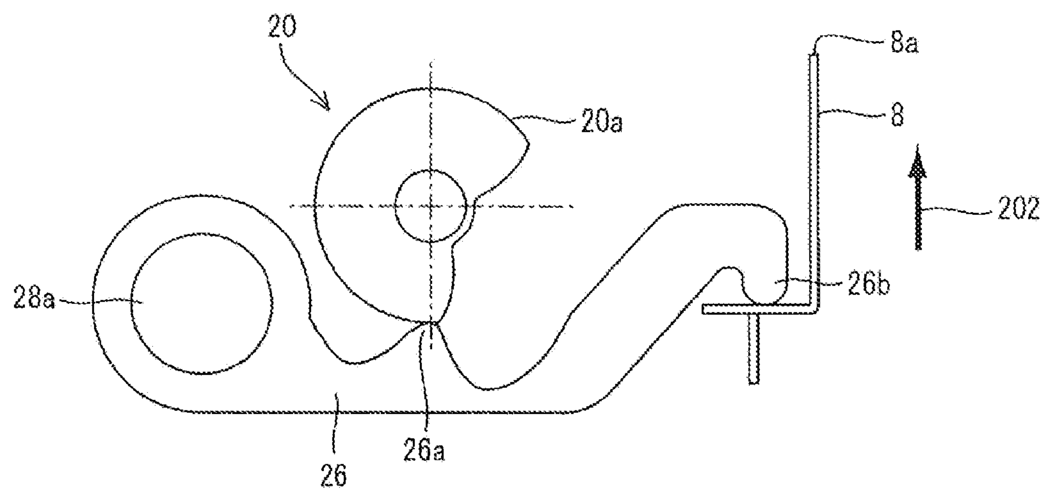
FIG. 6 is an illustration showing a structure of a shutter arm according to the first embodiment.

FIG. 6 is a diagram showing a structure of a shutter arm 26 according to the first embodiment. In FIG. 6, the transmission gear 20 has a cam surface 20*a* on a back side, and the shutter arm 26 pivotally moves around a rear idle gear shaft 28*a* as a center as contacting a projection 26*a* thereof with the cam surface 20*a*. A shutter pusher 26*b* of the shutter arm 26 is contacting the shutter 8 as to limit the movement of the shutter 8 urged in a direction of an arrow 202 with the shutter spring 10 shown in FIG. 3.

Figure 7:
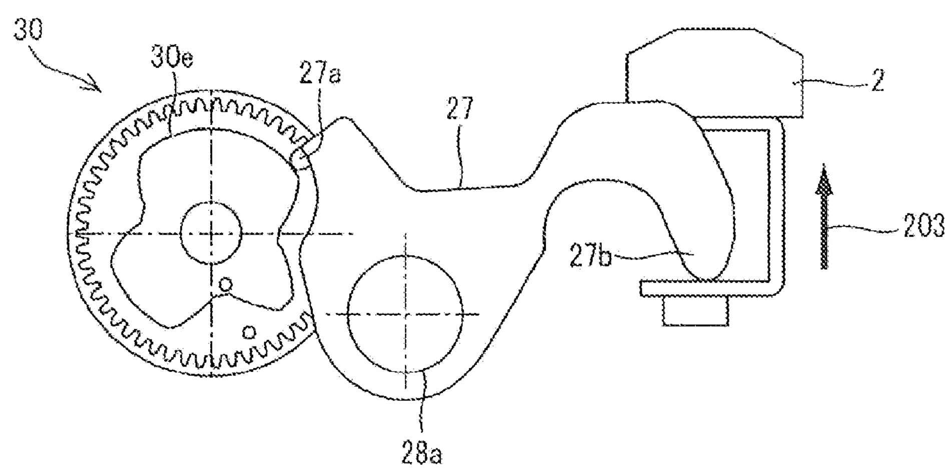
FIG. 7 is an illustration showing a structure of a platen arm according to the first embodiment.

FIG. 7 is a diagram showing a structure of a platen arm 27 according to the first embodiment. In FIG. 7, the rear roller gear 30 has a cam surface 30*e* on one side. The platen arm 27 pivotally moves around the rear idle gear shaft 28*a* as a center as contacting a projection 27*a* thereof with a cam surface 30*e* of the rear roller gear 30. A platen pusher 27*b* of the platen arm 27 is contacting the platen 2 as to limit the movement of the platen 2 urged in a direction of an arrow 203 with the platen spring 11 shown in FIG. 3.

Figure 8:
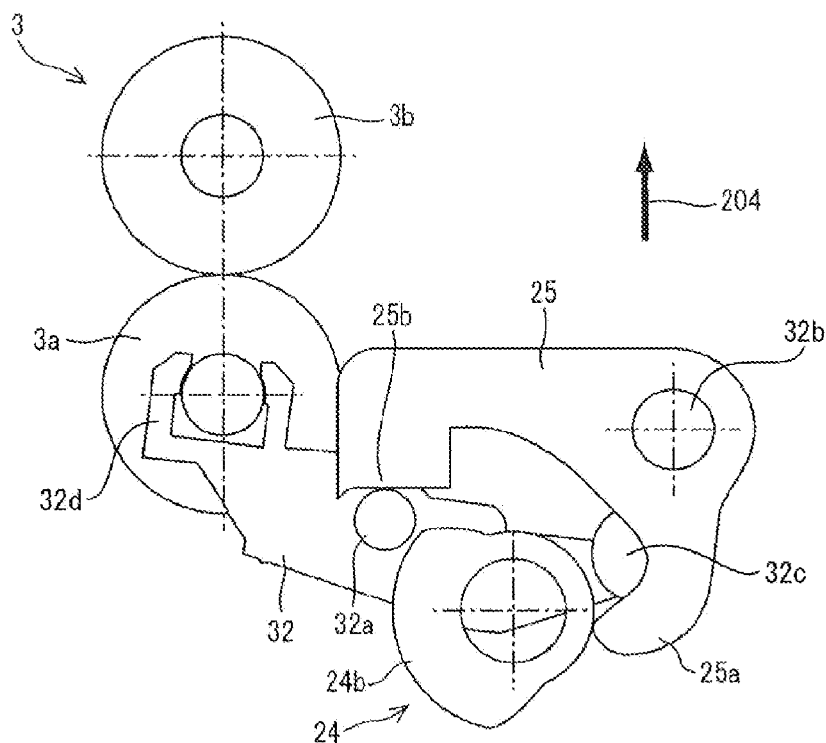
FIG. 8 is an illustration showing a structure of a front roller pair according to the first embodiment.
Figures 12A, 12B, 12C:
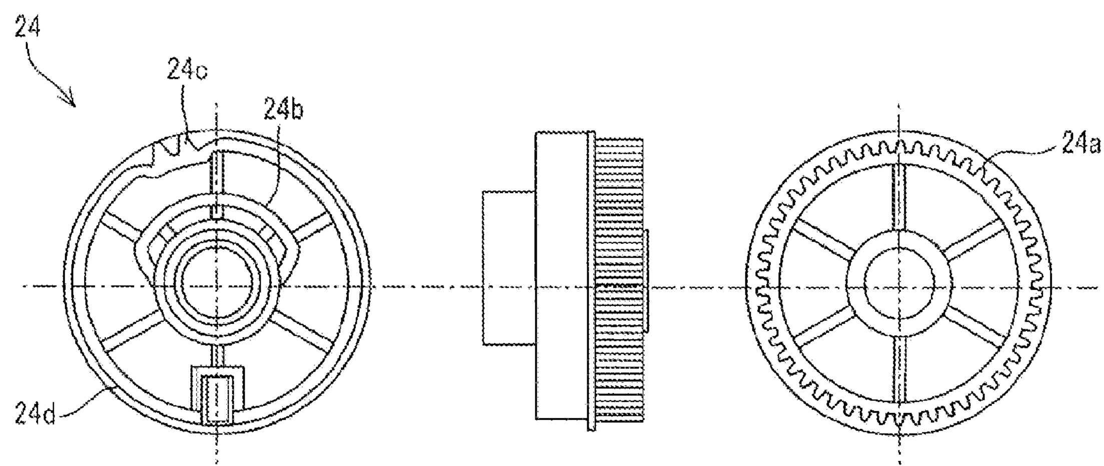

FIG. 8 is a diagram showing a structure of the front roller pair 3 according to the first embodiment; FIGS. 12A to 12C are illustrations showing a front roller gear 24 according to the first embodiment. In FIG. 8 and FIGS. 12A to 12C, the front roller gear 24 has a cam surface 24*b* on one side. A front roller arm 25 is fitted pivotally around a front boss 32*b* formed in a projecting manner on a mechanical chassis or frame. The front roller arm 25 pivotally moves around the front boss 32*b* as a center as contacting a projection 25*a* thereof with the cam surface 24*b* of the front roller gear 24. A front roller bracket 32 is arranged so as to be pivotally movable around a pivotal center 32*c*, and has a distal end 32*d* supporting the shaft of the front roller 3*a* in a rotatable manner.
The front roller bracket 32 is urged in a direction of an arrow 204 with the front roller spring 9 shown in FIG. 3. A front roller pusher 25*b* of the front roller arm 25 contacts a boss 32*a* formed at a middle of the front roller bracket 32, thereby restricting movement of the front roller bracket 32 in the direction of the arrow 204.

Figure 9:
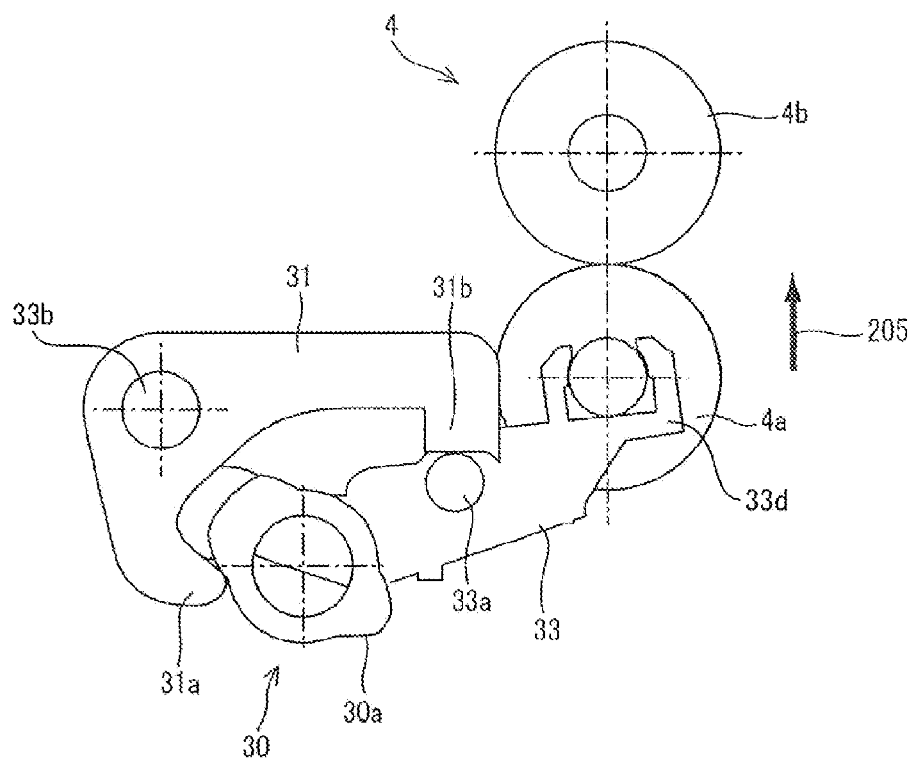
FIG. 9 is an illustration showing a structure of a rear roller pair according to the first embodiment.
Figures 13A, 13B, 13C:
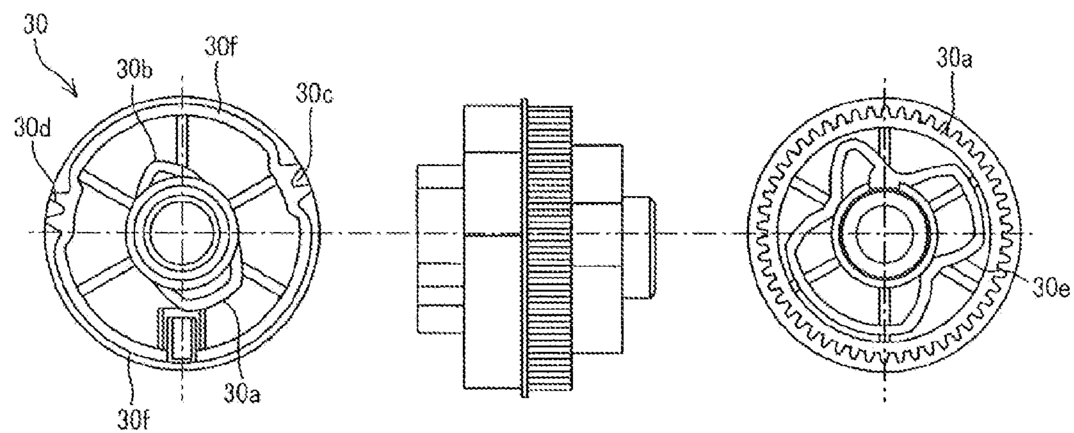

FIG. 9 is a diagram showing a structure of the rear roller pair 4 according to the first embodiment; FIGS. 13A to 13C are illustrations showing a rear roller gear 30 according to the first embodiment. In FIG. 9 and FIGS. 13A to 13C, the rear roller gear 30 has a cam surface 30*a* on one side. Similarly to the structure of the front roller pair 3, a rear roller arm 31 is fitted pivotally around a rear boss 33*b* formed in a projecting manner on a mechanical chassis or frame. The rear roller arm 31 pivotally moves around the rear boss 33*b* as a center as contacting a projection 31*a* thereof with the cam surface 30*a* of the rear roller gear 30. A rear roller bracket 33 is arranged so as to be pivotally movable, and has a distal end 33*d* supporting the shaft of the rear roller 4*a* in a rotatable manner. The rear roller bracket 33 is urged in a direction of an arrow 205 with the rear roller spring 12 shown in FIG. 3. A rear roller pusher 31*b* of the rear roller arm 31 contacts a boss 33*a* formed at a middle of the rear roller bracket 33, thereby restricting movement of the rear roller bracket 33 in the direction of the arrow 205.

Figure 10:
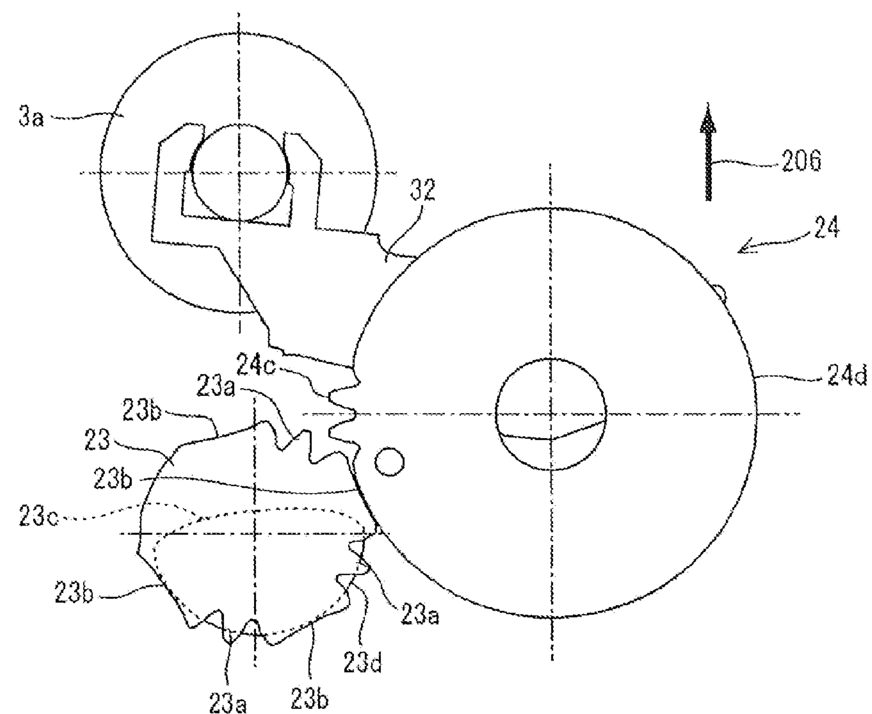
FIG. 10 is an illustration showing the front roller pair having a two contacting pressure stage selectable structure according to the first embodiment.
Figure 14A:
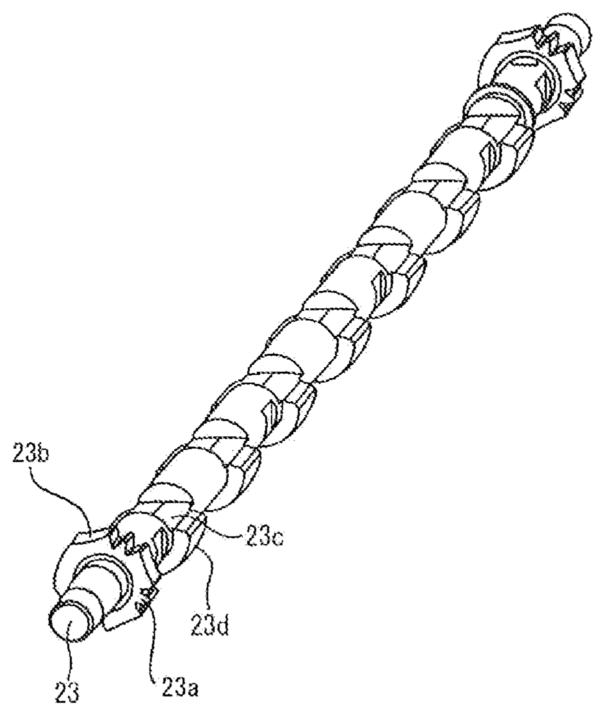
Figure 14B:
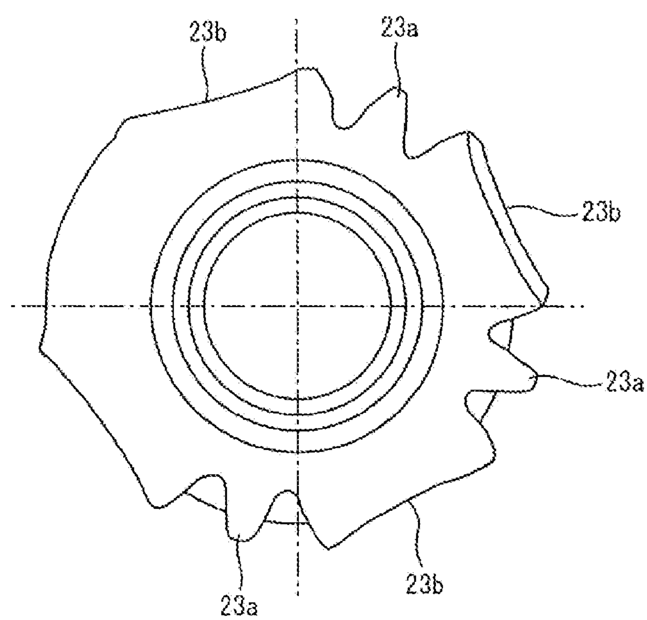

FIG. 10 is a diagram showing a structure of the front roller pair 3 switchable of the contacting pressure in two stages as being strong or weak; FIGS. 12A to 12C are illustrations showing the front roller gear 24 according to the first embodiment; FIGS. 14A, 14B are illustrations showing a front camshaft 23 according to the first embodiment. In FIG. 10, FIGS. 12A to 12C, and FIGS. 14A, 14B, the front roller gear 24 has a tooth portion 24*c* and a toothless portion 24*d* on a circumferential edge thereof, and a pitch circle diameter at the tooth portion 24*c* is substantially the same as a diameter at the toothless portion 24*d*. The front camshaft 23 has tooth portions 23*a*, toothless portions 23*b*, and cam surfaces 23*c*, 23*d*, and is arranged so that a pitch circle of the front camshaft 23 is in contact with the front roller gear 24. The toothless portion 23*b* has a curving shape of a certain radius of curvature corresponding to the shape of the toothless portion 24*d* of the front roller gear 24, and plays a role for bearing the toothless portion 24*d*.

As shown in FIG. 14A, the front camshaft 23 has the tooth portions 23*a* and the toothless portions 23*b* on each end. The front camshaft 23 has the cam surfaces 23*c*, 23*d* at plural points as to form a pair of the cam surface 23*c* and the cam surface 23*d*, respectively. At each point at which the cam surfaces 23*c*, 23*d* are arranged, the cam surface 23*c* is aligned on one side whereas the cam surface 23*d* is aligned on the other side along the shaft of the front camshaft 23. The cam surface 23*c* of the front camshaft 23 has a shorter effective radius than the cam surface 23*d* of the front camshaft 23. The front roller spring 9 is provided between the front roller bracket 32 and either of the cam surfaces 23*c*, 23*d* of the front camshaft 23, thereby urging the front roller bracket 32 in a direction of an arrow 206 in FIG. 10.

Figure 11:
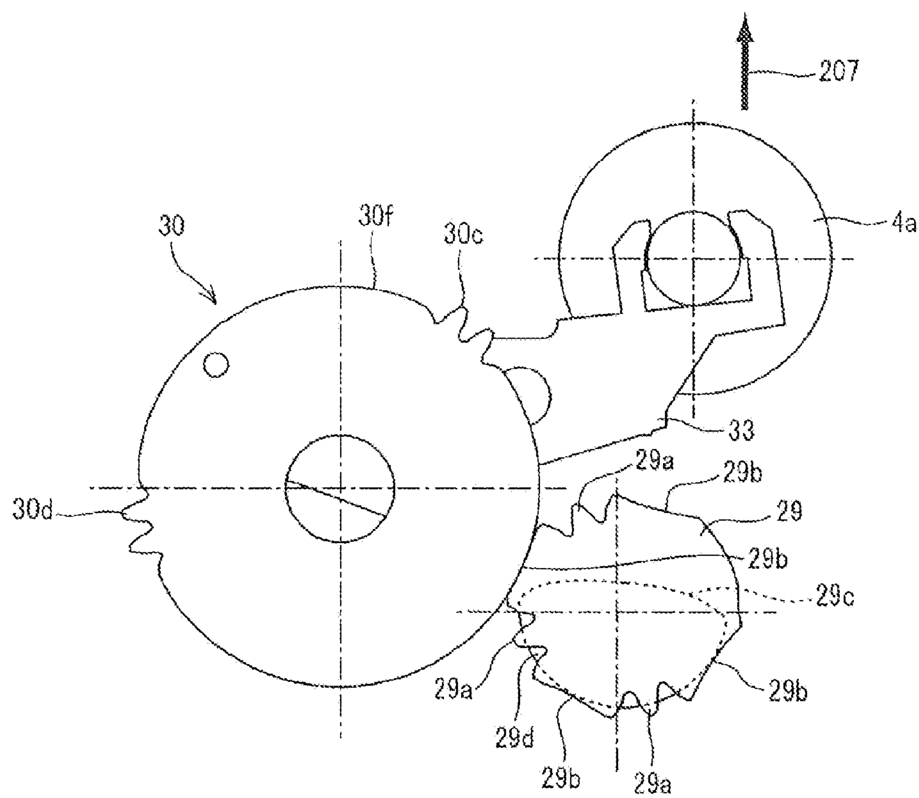
FIG. 11 is an illustration showing the rear roller pair having a two contacting pressure stage selectable structure according to the first embodiment.
Figure 15A:
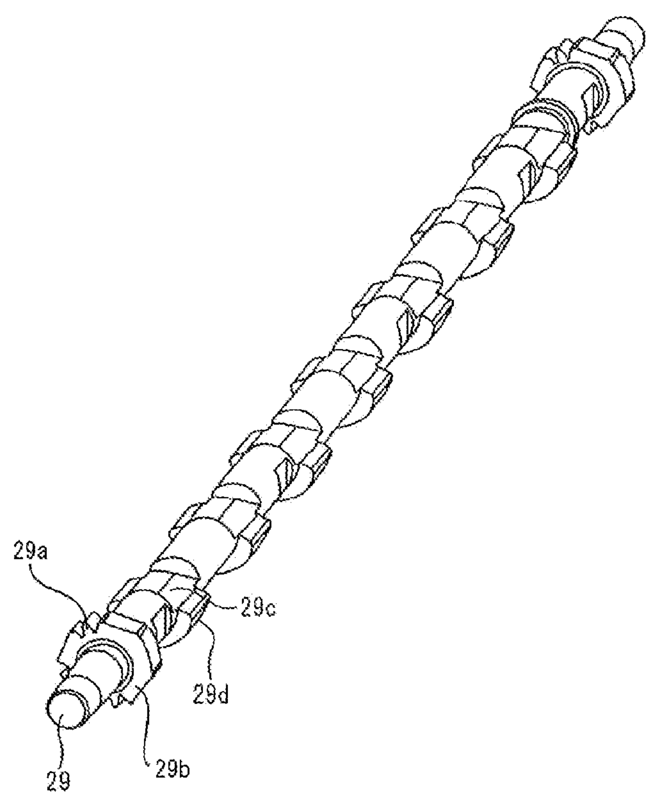
Figure 15B:
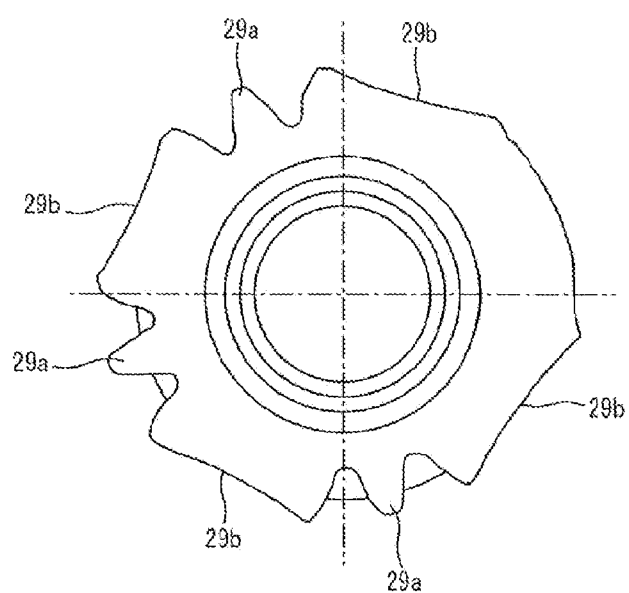

FIG. 11 is a diagram showing a structure of the rear roller pair 4 switchable of the contacting pressure in two stages as being strong or weak; FIGS. 13A to 13C are illustrations showing the rear roller gear 30 according to the first embodiment; FIGS. 15A, 15B are illustrations showing a rear camshaft 29 according to the first embodiment. In FIG. 11, FIGS. 13A to 13C, and FIGS. 15A, 15B, the rear roller gear 30 has a tooth portion 30*c*, a tooth portion 30*d*, and a toothless portion 30*f* on a circumferential edge thereof, and a pitch circle diameter at the tooth portions 30*c*, 30*d* is substantially the same as a diameter at the toothless portion 30*f*. The rear camshaft 29 has tooth portions 29*a*, toothless portions 29*b*, and cam surfaces 29*c*, 29*d*, and is arranged so that a pitch circle of the rear camshaft 29 is in contact with the rear roller gear 30. The toothless portion 29*b* has a curving shape of a certain radius of curvature corresponding to the shape of the toothless portion 30*f* of the rear roller gear 30, and plays a role for bearing the toothless portion 30*f*.

As shown in FIG. 15A, the rear camshaft 29 has the tooth portions 29*a* and the toothless portions 29*b* on each end. The rear camshaft 29 has the cam surfaces 29*c*, 29*d* at plural points as to form a pair of the cam surface 29*c* and the cam surface 29*d*, respectively. At each point at which the cam surfaces 29*c*, 29*d* are arranged, the cam surface 29*c* is aligned on one side whereas the cam surface 29*d* is aligned on the other side along the shaft of the rear camshaft 29. The cam surface 29*c* of the rear camshaft 29 has a shorter effective radius than the cam surface 29*d* of the rear camshaft 29. The rear roller spring 12 is provided between the rear roller bracket 33 and either of the cam surfaces 29*c*, 29*d* of the rear camshaft 29, thereby urging the rear roller bracket 33 in a direction of an arrow 207 in FIG. 11.

In operation of the medium conveyance unit 100, as shown in FIG. 3, the front roller pair 3 and the rear roller pair 4 operate cueing the medium when loaded, line feeding during printing, and ejecting the medium by normally or reversely rotating from the drive of the medium conveyance motor shown in FIG. 1. Where a switching lever not shown is positioned to a continuous form sheet side, the tractors 34 shown in FIG. 1 rotate normally or reversely in addition to the front roller pair 3 and the rear roller pair 4.

In operation of the printing unit 1, as shown in FIG. 2, the carriage 1*a* securing the printing head 1 moves in the substrate-scanning direction by means of the space motor 38 shown in FIG. 1 according to the printing data, thereby operating to achieve prescribed printing results.

The mode change unit 102 shifts the modes described below according to the types of the media and the printing states, thereby switching the states of being close or remote of a distance between the platen 2 and the printing head 1, opening or closing of the shutter 8 in the paper passing route serving as the medium conveyance route, and contacting or separating of the respective roller pairs made of the front roller pair 3 and the rear roller pair 4 as well as being strong or weak of the contacting pressure of the roller pairs.

Referring to the drawings, particularly from FIG. 16 to FIG. 33, operable portions are described. FIG. 16 to FIG. 33 are illustrations showing respective operable portions in respective modes according to the first embodiment. It is to be noted that the mode in this specification means a state of the apparatus in respect to the medium conveyance and the printing operation and, more specifically, means a combination of respective settings of the switching operation between contacting or separating in the medium conveyance roller pairs, the two stage switching operation of being strong or weak in the contacting pressure of the medium conveyance roller pairs, the switching operation of being close or remote in regard to the distance between the platen 2 and the printing head, and the switching operation of opening and closing of the shutter 8.

In this embodiment, the modes are eighteen types. In FIG. 16 to FIG. 33, respectively for each mode, portion (a) shows a state of contacting or separating at the front roller pair; portion (b) shows a state of being strong or weak of the contacting pressure of the front roller pair; portion (c) shows a state of opening or closing of the shutter; portion (d) shows a state of being close or remote between the printing head and the platen; portion (e) shows a state of contacting or separating at the rear roller pair; portion (f) shows a state of being strong or weak of the contacting pressure of the rear roller pair.

Figure 16:
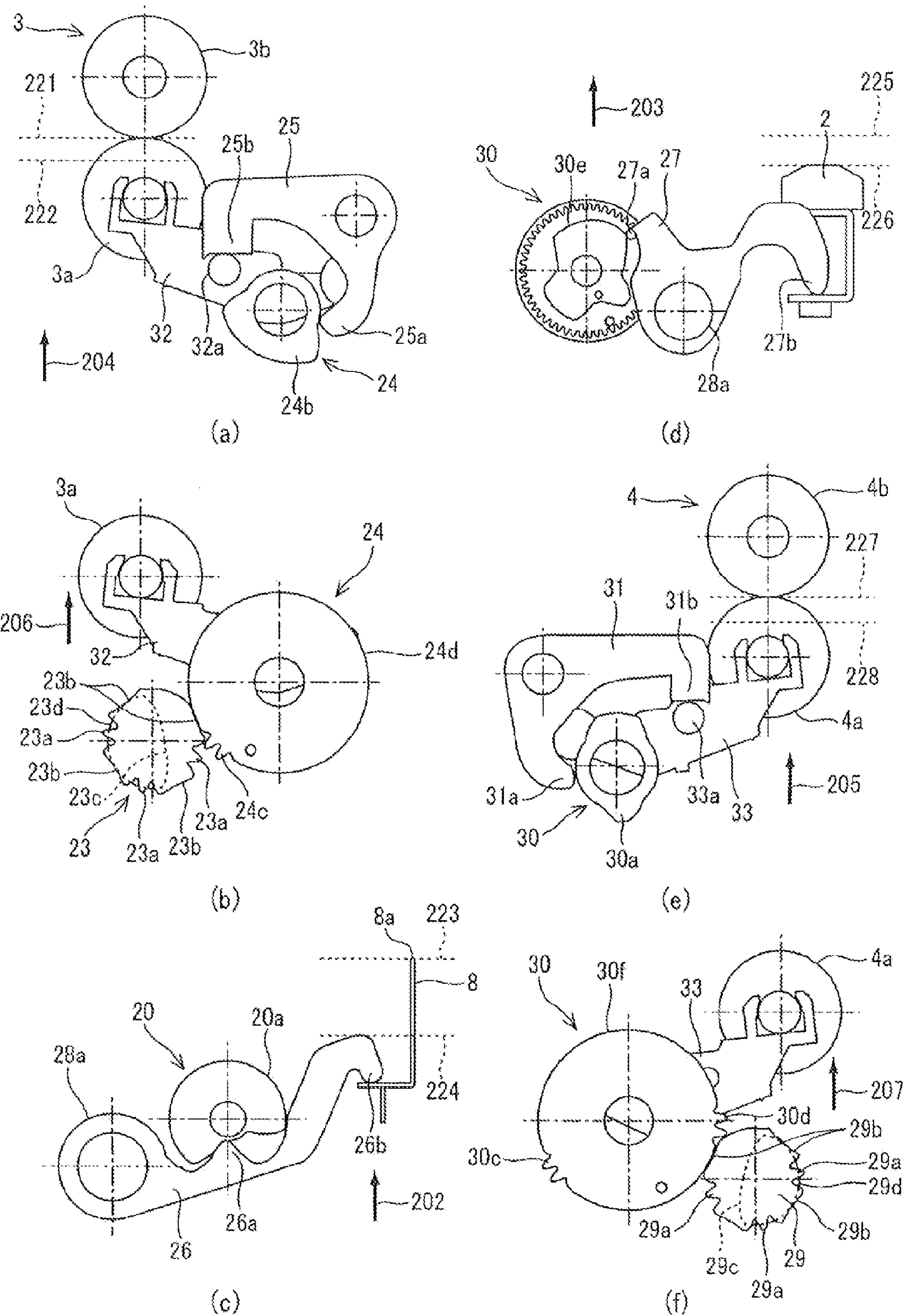
FIG. 16 is an illustration showing respective operable portions of the mode change unit in mode #1 according to the first embodiment.
Figure 17:
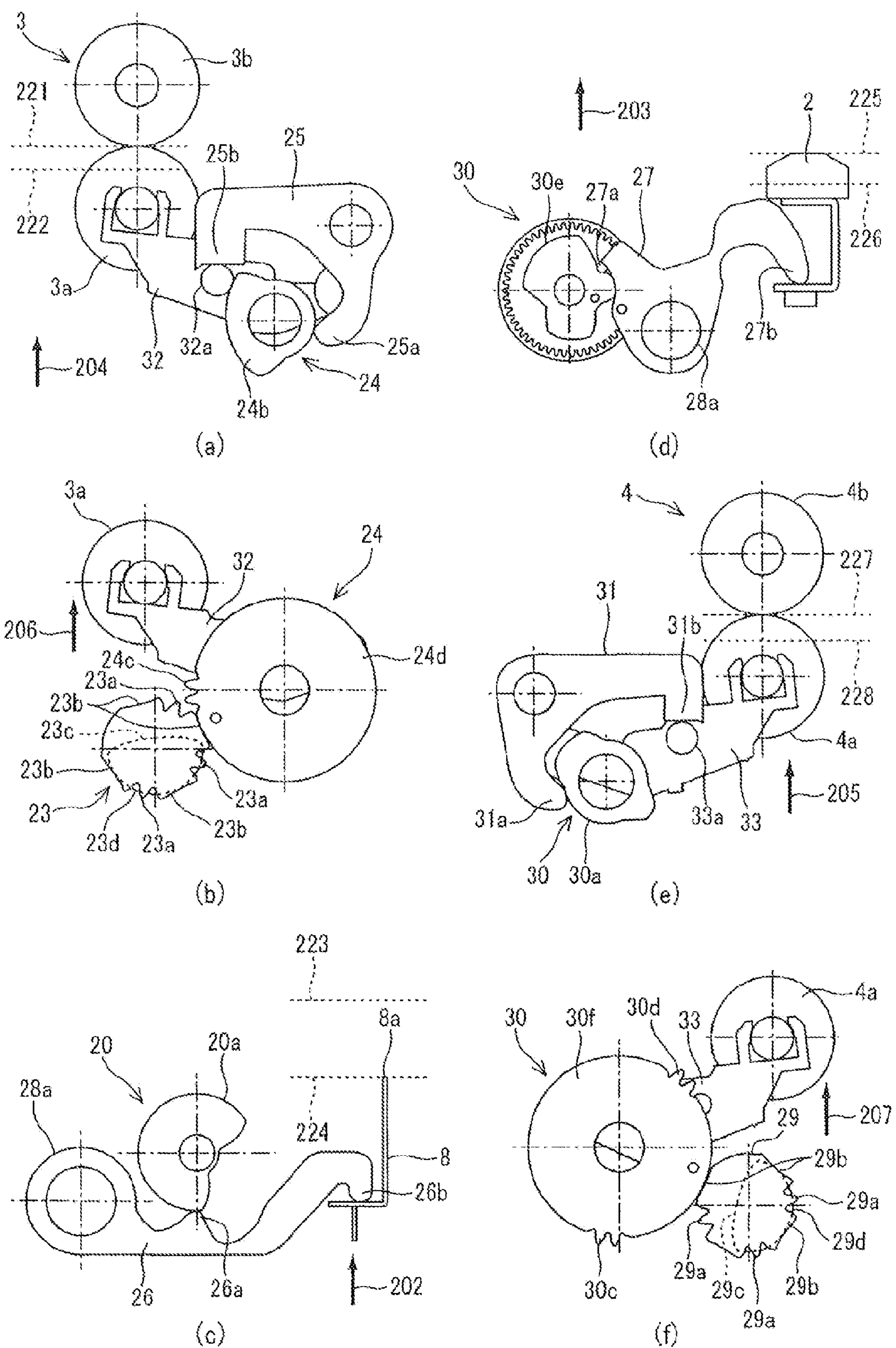
FIG. 17 is an illustration showing respective operable portions of the mode change unit in mode #2 according to the first embodiment.

In operation of opening and closing of the shutter 8, in portions (c) of FIG. 16 and FIG. 17, the transmission gear 20 rotates via a gear series not shown by drive of the mode change motor 13 shown in FIG. 4 based on signals sent from the controller 35. The cam surface 20*a* formed on the transmission gear 20 rotates according to the motion of the gear 20.

The portion (c) of FIG. 16 shows a state that an end 8*a* of the shutter 8 moves to a closing line of the paper passing route shown by a broken line 223, and shows the closed state of the shutter 8.

In the portion (c) of FIG. 16, because the projection 26*a* of the shutter arm 26 contacts the cam surface 20*a* having a smaller radius, and because the shutter arm 26 is in a state pivotally movable in a counterclockwise direction around the rear idle gear shaft 28*a* as a pivot center, the position of the shutter pusher 26*b* moves, so that the shutter 8 urged by the shutter spring 10 shown in FIG. 3 in the direction of the arrow 202 shows a state that the shutter 8 moved to the closing line of the paper passing route shown by the broken line 223.

The portion (c) of FIG. 17 shows a state that the shutter end 8*a* moves to an opening line of the paper passing route as shown by a broken line 224 to open the paper passing route, and shows a state that the shutter 8 is open. In the portion (c) of FIG. 17, the position of the projection 26*a* of the shutter arm 26 moves to a portion having a large radius of the cam surface 20*a*, and the shutter end 8*a* shows a state to move to the opening line of the paper passing route shown by the broken line 224 in opposing the urging force of the shutter spring 10 shown in FIG. 3.

Next, operation of contacting or separating between the platen 2 and the printing head 1 is described. In portions (d) of FIG. 16, FIG. 17, the drive of the mode change motor 13 shown in FIG. 4 rotates the rear roller gear 30 via the gear series not shown, and rotates the cam surface 30*a* formed at the rear roller gear 30 according to this rotation. The portion (d) in FIG. 16 shows a state that the platen 2 is separating from the printing head 1 shown in FIG. 3. With this state, because the projection 27*a* of the platen arm 27 contacts the surface having a large radius of the cam surface 30*e* of the rear roller gear 30, the projection 27*a* moves in the opposite direction of the arrow 203 in FIG. 16 where the platen arm 27 move pivotally in the clockwise direction around the rear idle gear shaft 28*a* as a pivot center, thereby pushing down the platen 2 in the opposite direction to the arrow 203 in opposing to the urging force of the platen spring 11 shown in FIG. 3.

The portion (d) in FIG. 17 shows a state that the platen 2 contacts the printing head 1 shown in FIG. 3. Because the projection 27*a* of the platen arm 27 contacts a surface having a small radius of the cam surface 30*e* of the rear roller gear 30, the projection 27*a* moves in the direction of the arrow 203 in FIG. 7 according to the urging force of the platen spring 11 shown in FIG. 3 where the platen arm 27 is pivotally movable around the rear idle gear shaft 28*a* as the pivot center, thereby consequentially pushing up the platen 2 in the direction of the arrow 203.

Operation of contacting and separating the front roller pair 3 is described next. In the portion (a) in FIG. 20 and the portion (a) of FIG. 21, the drive of the mode change motor 13 shown in FIG. 4 rotates the front roller gear 24 via the gear series not shown, so that the cam surface 24*b* formed at the front roller gear 24 rotates according to this rotation.

Figure 20:
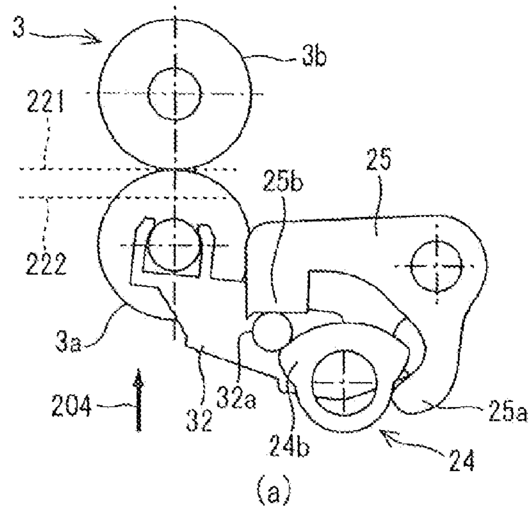
FIG. 20 is an illustration showing respective operable portions of the mode change unit in mode #5 according to the first embodiment.
Figure 20:
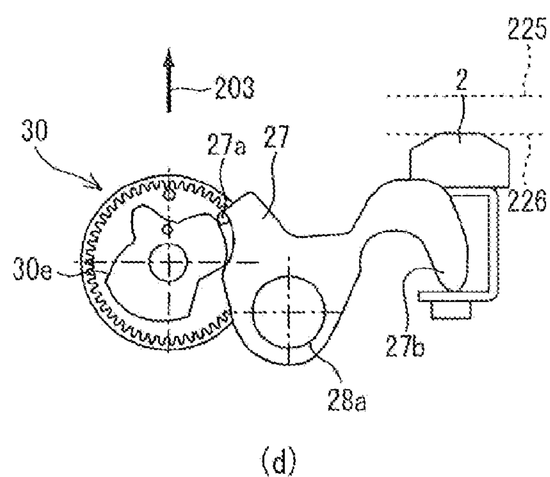
Figure 20:
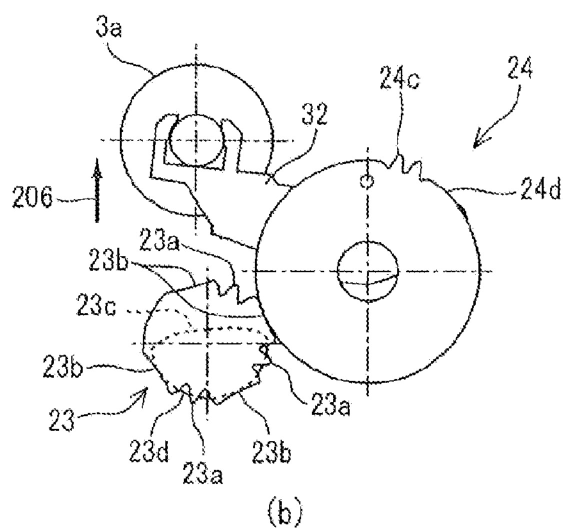
Figure 20:
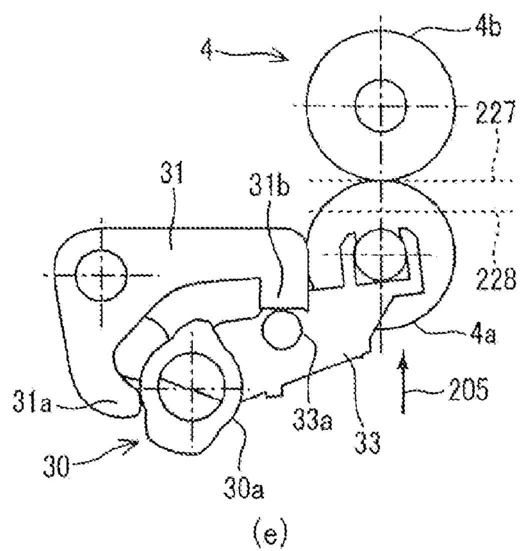
Figure 20:
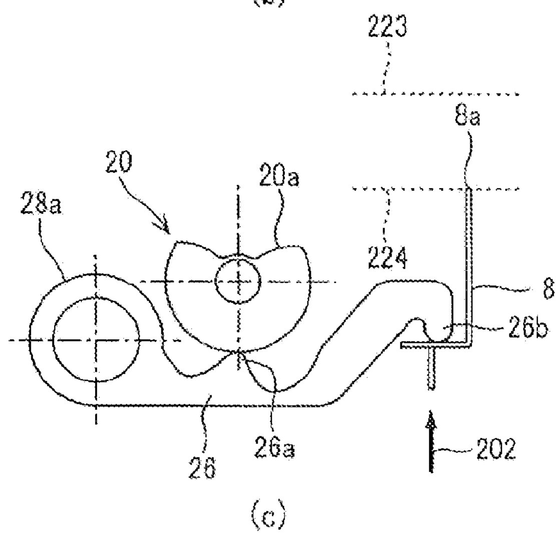
Figure 20:
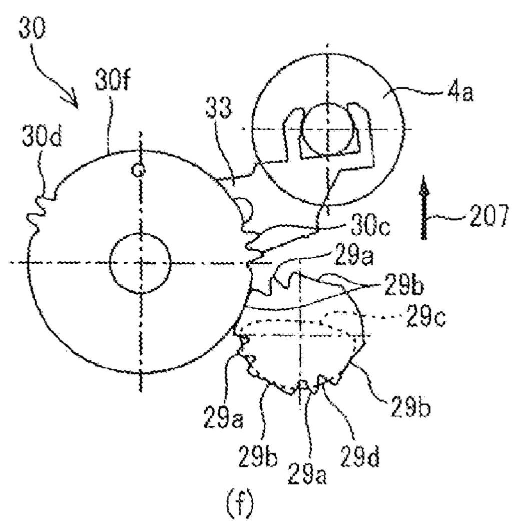

The portion (a) in FIG. 20 shows a state that the front roller 3*a* and the front roller 3*b* of the front roller pair 3 contact to each other. In the portion (a) in FIG. 20, the projection 25*a* of the front roller arm 25 contacts s a portion having a smaller radius of the cam surface 24*b* of the front roller gear 24. The front roller pusher 25*b* and the projection 32*a* of the front roller bracket 32 at that time come into a positional relationship that the front roller 3*a* contacts the front roller 3*b*, and the front roller 3*a* and the front roller 3*b* contact each other at a broken line 221 because the front roller bracket 32 is urged by the front roller spring 9 shown in FIG. 3 in the direction of the arrow 204.

Figure 21:
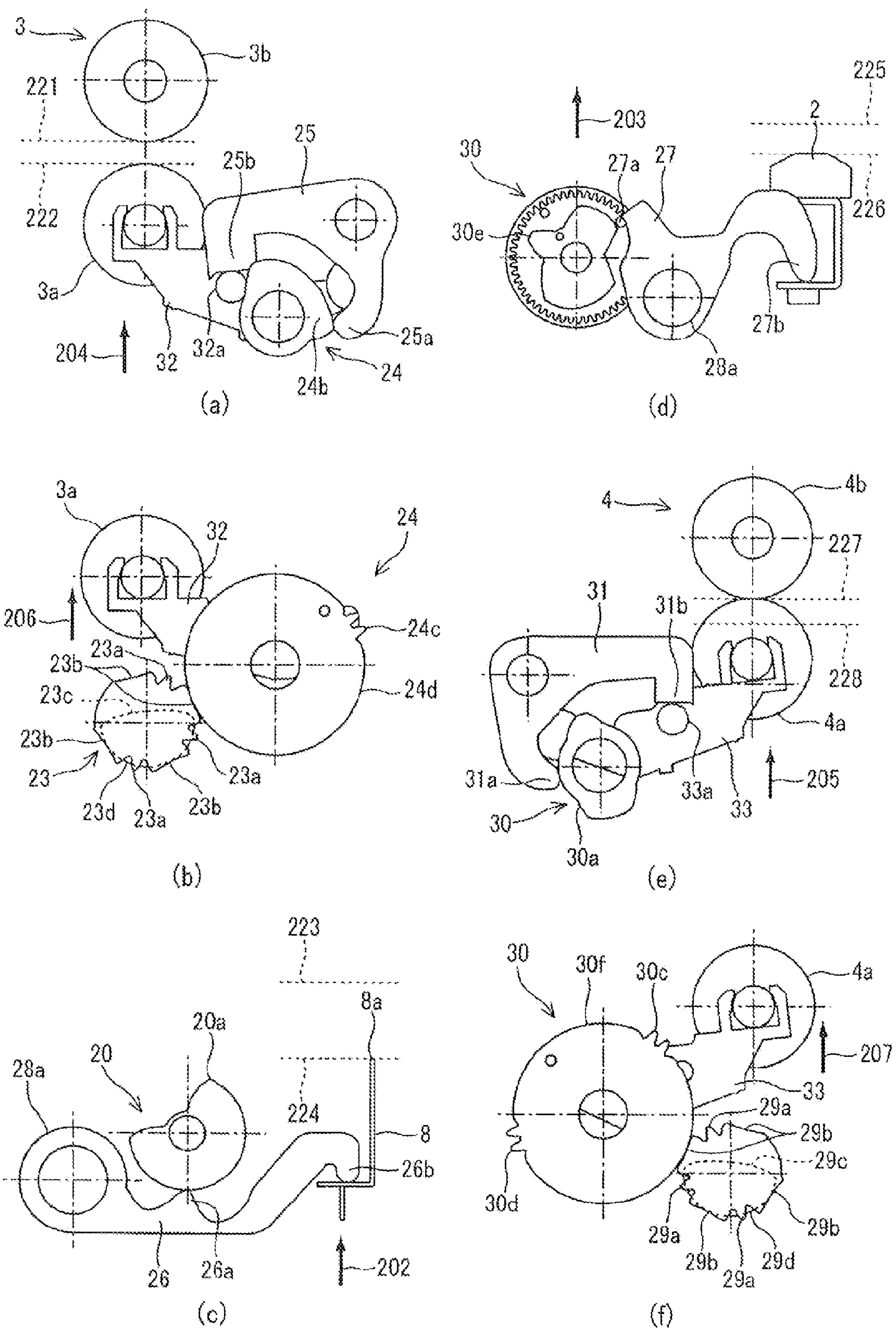
FIG. 21 is an illustration showing respective operable portions of the mode change unit in mode #6 according to the first embodiment.
Figure 22:
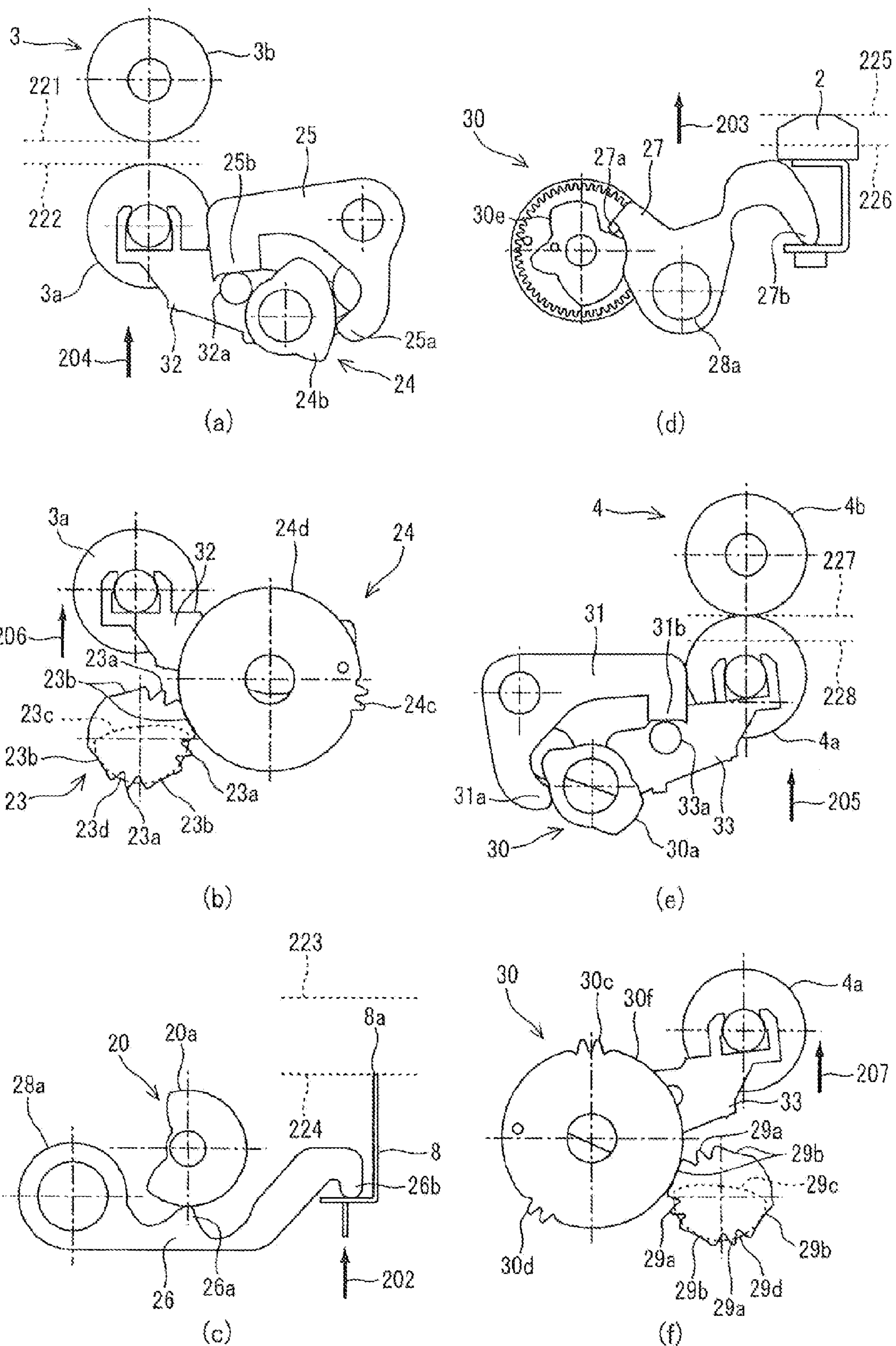
FIG. 22 is an illustration showing respective operable portions of the mode change unit in mode #7 according to the first embodiment.
Figure 23:
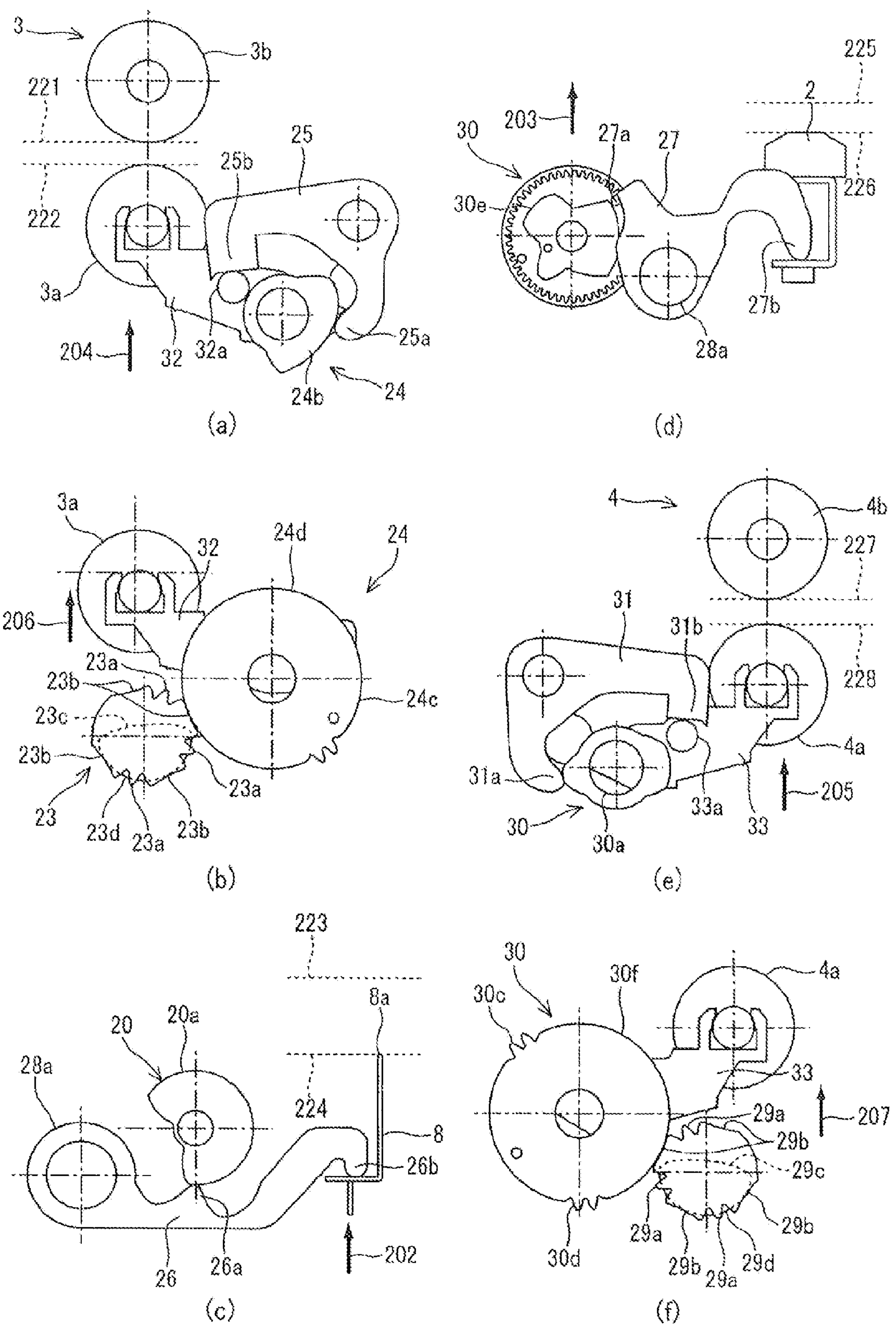
FIG. 23 is an illustration showing respective operable portions of the mode change unit in mode #8 according to the first embodiment.
Figure 24:
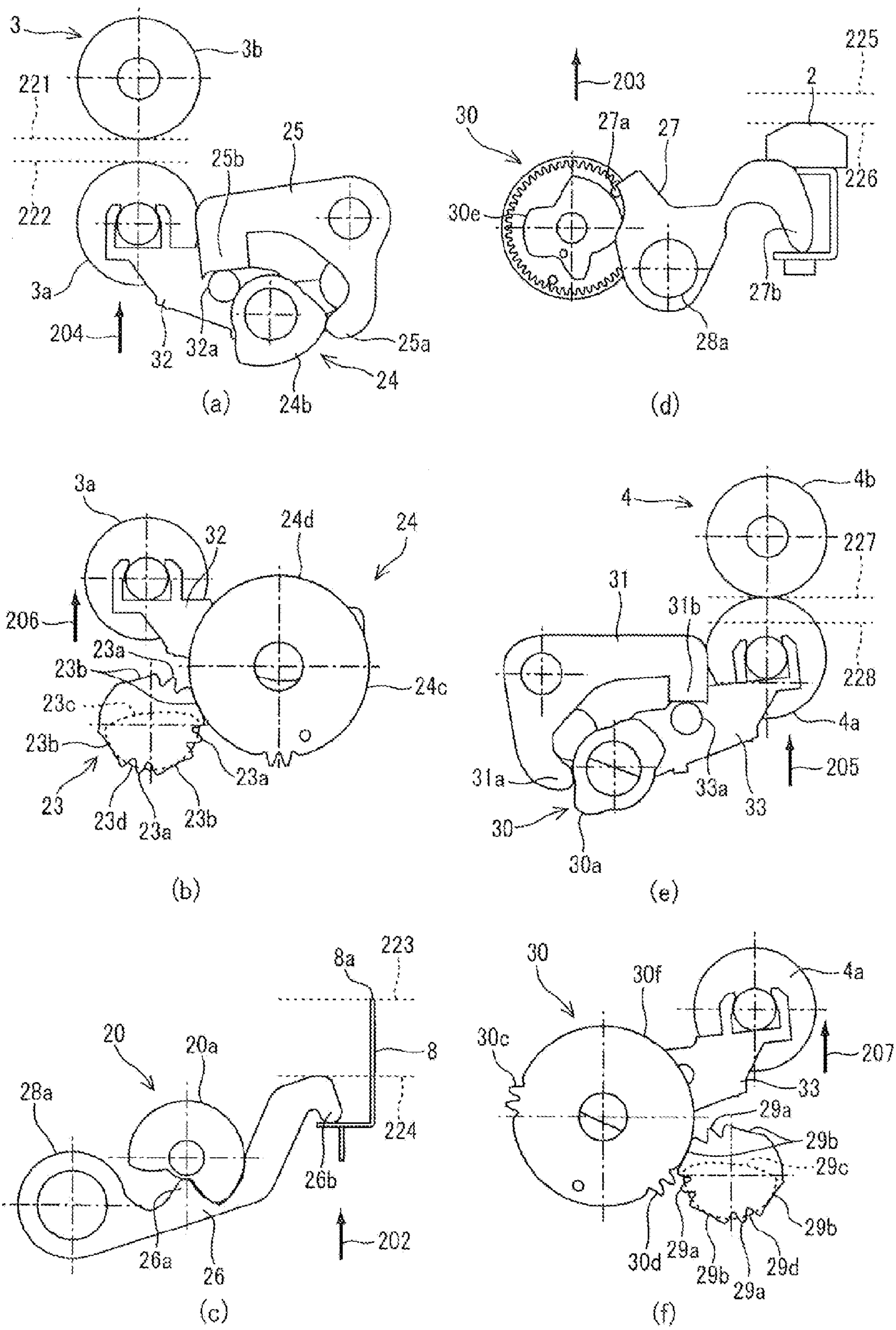
FIG. 24 is an illustration showing respective operable portions of the mode change unit in mode #9 according to the first embodiment.

The portion (a) in FIG. 21 shows a state that the front roller 3*a* and the front roller 3*b* of the front roller pair 3 separate from each other. In the portion (a) in FIG. 21, the projection 25*a* of the front roller arm 25 contacts s a portion having a larger radius of the cam surface 24*b* of the front roller gear 24. The front roller pusher 25*b* moves down the projection 32*a* of the front roller bracket 32 in opposing the urging force of the front roller spring 9 shown in FIG. 3 urging the front roller bracket 32 in the direction of the arrow 204, thereby separating the front roller 3*b* and the front roller 3*a* from each other so as to have an interval between the broken line 221 and the broken line 222.

Operation of contacting and separating the rear roller pair 4 is described next. In the portion (e) in FIG. 17 and the portion (e) of FIG. 18, the drive of the mode change motor 13 shown in FIG. 4 rotates the rear roller gear 30 via the gear series not shown, so that the cam surface 30*b* formed at the rear roller gear 30 rotates according to this rotation.

The portion (e) in FIG. 17 shows a state that the rear roller 4*a* and the rear roller 4*b* of the rear roller pair 4 contact to each other. In the portion (e) in FIG. 17, the projection 31*a* of the rear roller arm 31 contacts s a portion having a smaller radius of the cam surface 30*b* of the rear roller gear 30. The rear roller pusher 31*b* and the projection 33*a* of the rear roller bracket 33 at that time come into a positional relationship that the rear roller 4*a* contacts the rear roller 4*b*, and the rear roller 4*a* and the rear roller 4*b* contact each other at a broken line 227 because the rear roller bracket 33 is urged by the rear roller spring 12 shown in FIG. 3 in the direction of the arrow 205.

Figure 18:
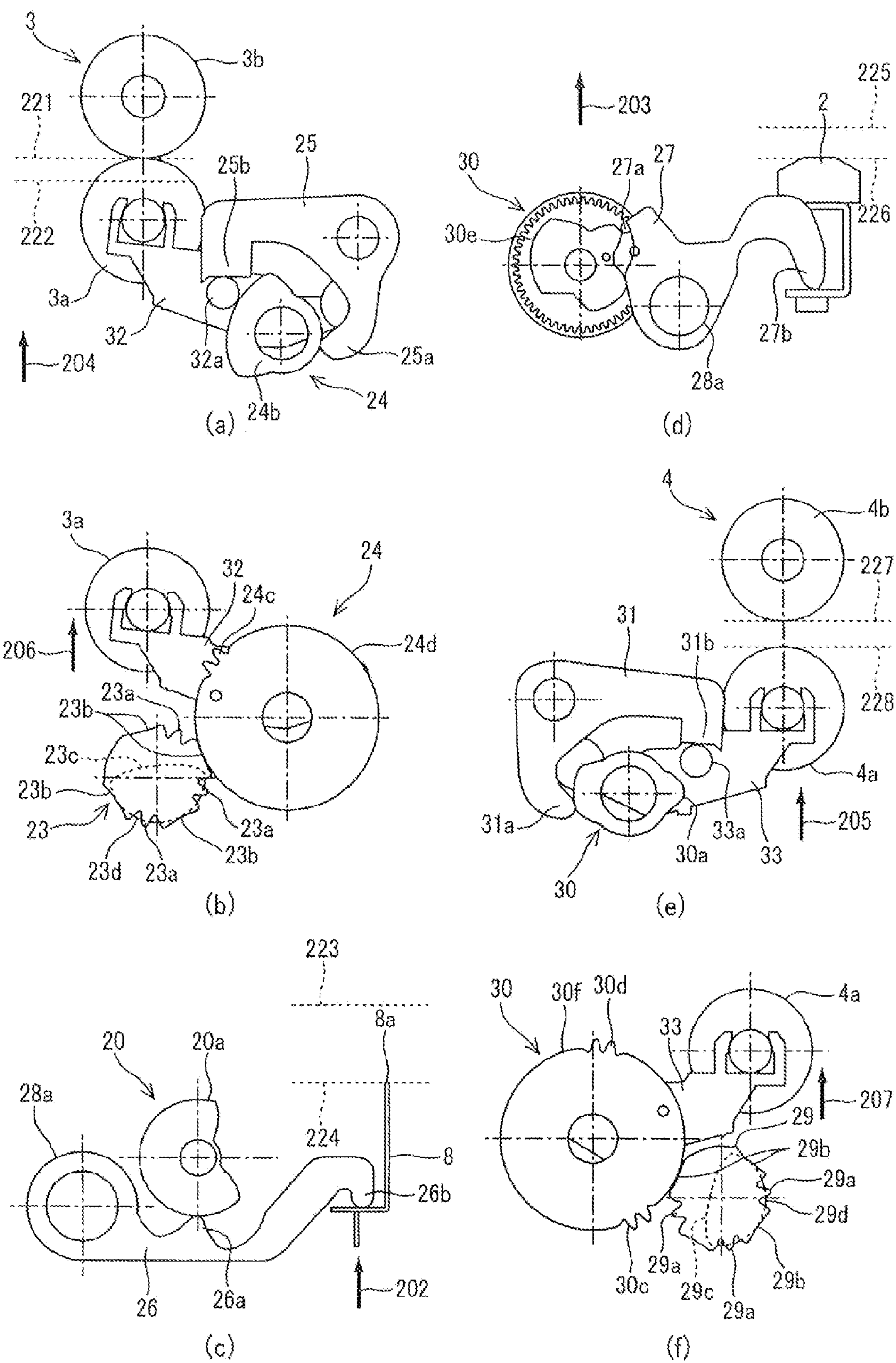
FIG. 18 is an illustration showing respective operable portions of the mode change unit in mode #3 according to the first embodiment.

The portion (e) in FIG. 18 shows a state that the rear roller 34 and the rear roller 4*b* of the rear roller pair 4 separate from each other. In the portion (e) in FIG. 18, the projection 31*a* of the rear roller arm 31 contacts s a portion having a larger radius of the cam surface 30*b* of the rear roller gear 30. The rear roller pusher 31*b* moves down the projection 33*a* of the rear roller bracket 33 in opposing the urging force of the rear roller spring 12 shown in FIG. 3 urging the rear roller bracket 33 in the direction of the arrow 205, thereby separating the rear roller 4*b* and the rear roller 4*a* from each other so as to have an interval between the broken line 227 and the broken line 228.

Next, operation of contacting pressure of the rear roller pair 4 as to switch the pressure between being strong and weak is described. In the portions (f) in FIG. 18, FIG. 19, and FIG. 20, the drive of the mode change motor 13 shown in FIG. 4 rotates the rear roller gear 30 via the gear series not shown, and at that time the rear roller gear 30 rotates in the counterclockwise direction as proceeding from FIG. 18 to FIG. 20.

In the portion (f) in FIG. 18, the rear camshaft 29 does not rotate because the toothless portion 30*f* of the rear roller gear 30 and the toothless portion 29*b* of the rear camshaft 29 contact each other. The cam surface 29*d* of the rear camshaft 29, at that time, is in the effective state, and the cam surface 29*d* has a larger effective radius in comparison with the cam surface 29*c*, thereby producing stronger contacting pressure at the rear roller pair 4 than that in the state shown in the portion (f) in FIG. 20 as described below by contracting the rear roller spring 12 shown in FIG. 3 urging the rear roller bracket 33 in the direction of the arrow 207.

Figure 19:
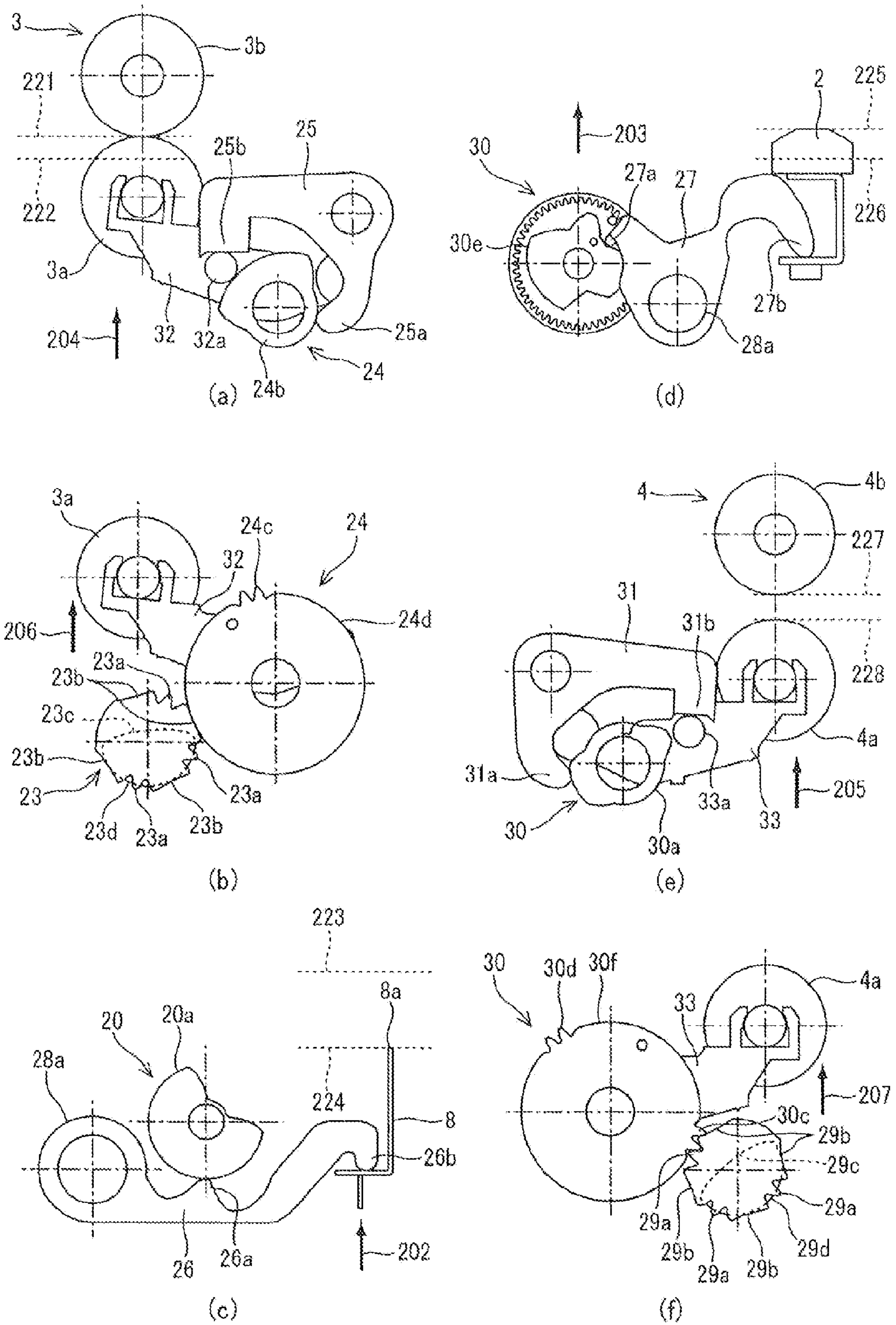
FIG. 19 is an illustration showing respective operable portions of the mode change unit in mode #4 according to the first embodiment.

In the portion (f) in FIG. 19, the rear roller gear 30 rotates in the counterclockwise direction; the tooth portion 30*c* meshes the tooth portion 29*a* of the rear camshaft 29; the rear camshaft 29 rotates in the clockwise direction in the drawing. At that time, the cam surface 29*c* of the rear camshaft 29 contracts the rear roller spring 12 shown in FIG. 3 urging the rear roller bracket 33 in the direction of the arrow 207 with an inclined state of about 45 degrees.

In the portion (f) in FIG. 20, the rear roller gear 30 rotates in the counterclockwise direction, and the rear camshaft 29 further rotates in the clockwise direction in the drawing because the tooth portion 30*c* already meshes the tooth portion 29*a* of the rear camshaft 29. At that time, the cam surface 29*c* of the rear camshaft 29 is in a substantially horizontal state, thereby less contracting the rear roller spring 12 shown in FIG. 3 urging the rear roller bracket 33 in the direction of the arrow 207 than that in the state shown in the portion (f) in FIG. 18. Consequently, weaker contacting force is produced to the rear roller pair 4 in comparison with the state shown in the portion (f) in FIG. 18.

Next, operation of contacting pressure of the front roller pair 3 as to switch the pressure between being strong and weak is described. In the portions (f) in FIG. 25 and FIG. 26, the drive of the mode change motor 13 shown in FIG. 4 rotates the front roller gear 24 via the gear series not shown, and at that time the front roller gear 24 rotates in the clockwise direction as proceeding from FIG. 25 to FIG. 26.

Figure 25:
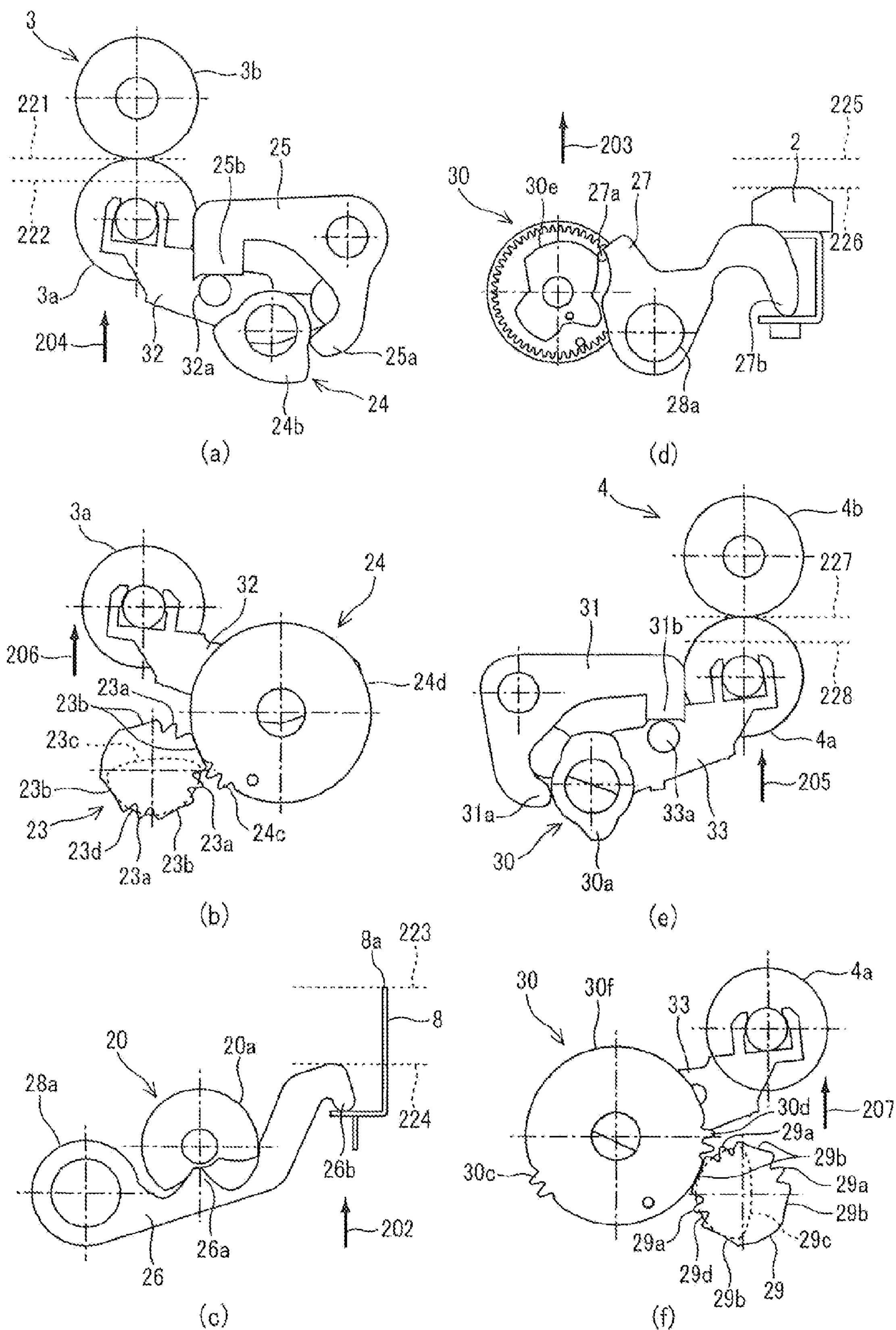
FIG. 25 is an illustration showing respective operable portions of the mode change unit in mode #10 according to the first embodiment.

In the portion (f) in FIG. 25, the front camshaft 23 does not rotate because the toothless portion 24*d* of the front roller gear 24 and the toothless portion 23*b* of the front camshaft 23 contact each other. The cam surface 23*c* of the front camshaft 23, at that time, is in the effective state, and the cam surface 23*c* has a smaller effective radius in comparison with the cam surface 23*d*, thereby producing weaker contacting pressure at the front roller pair 3 than that in the state shown in the portion (b) in FIG. 26 as described below by lightly contracting the front roller spring 9 shown in FIG. 3 urging the front roller bracket 32 in the direction of the arrow 206.

Figure 26:
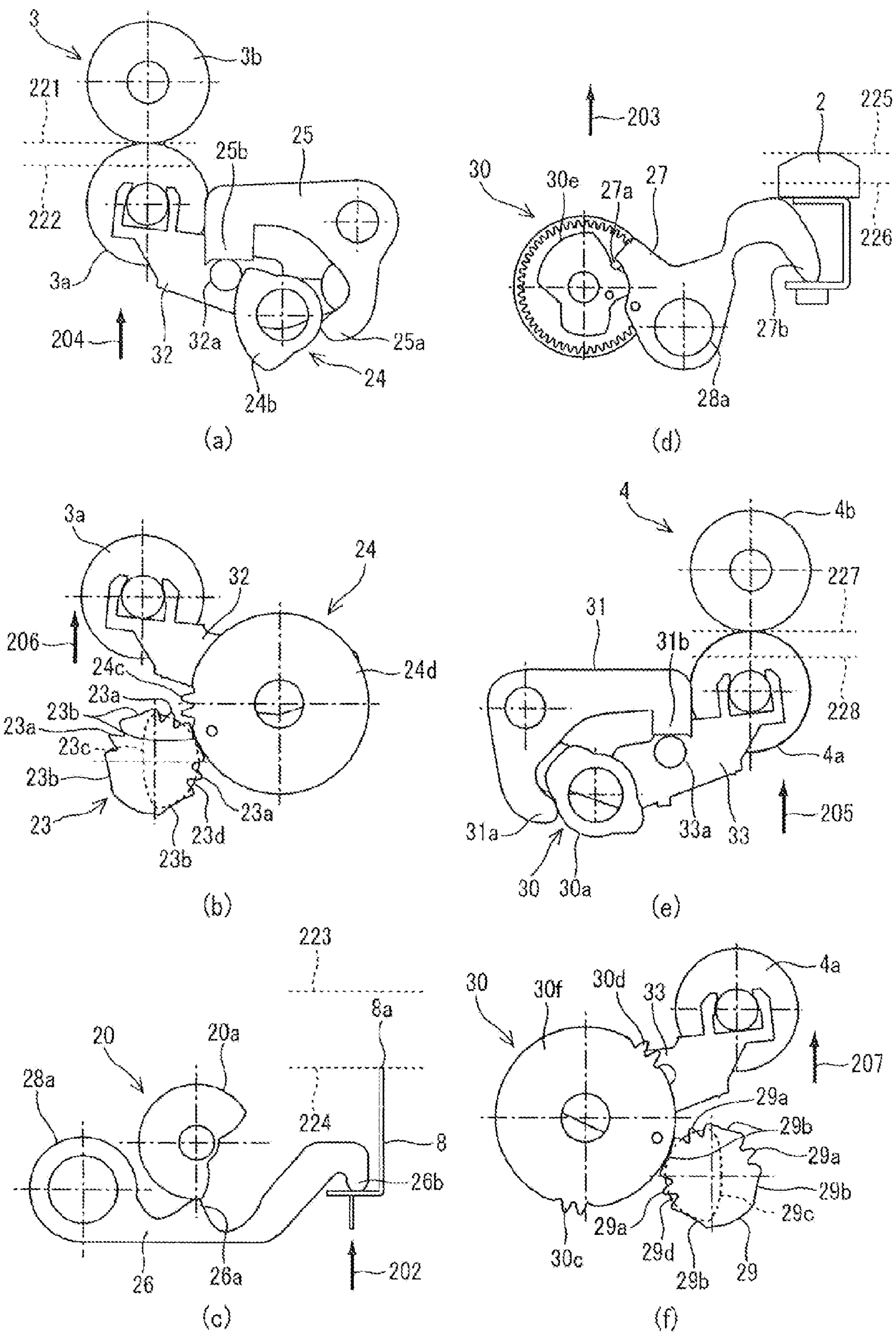
FIG. 26 is an illustration showing respective operable portions of the mode change unit in mode #11 according to the first embodiment.
Figure 27:
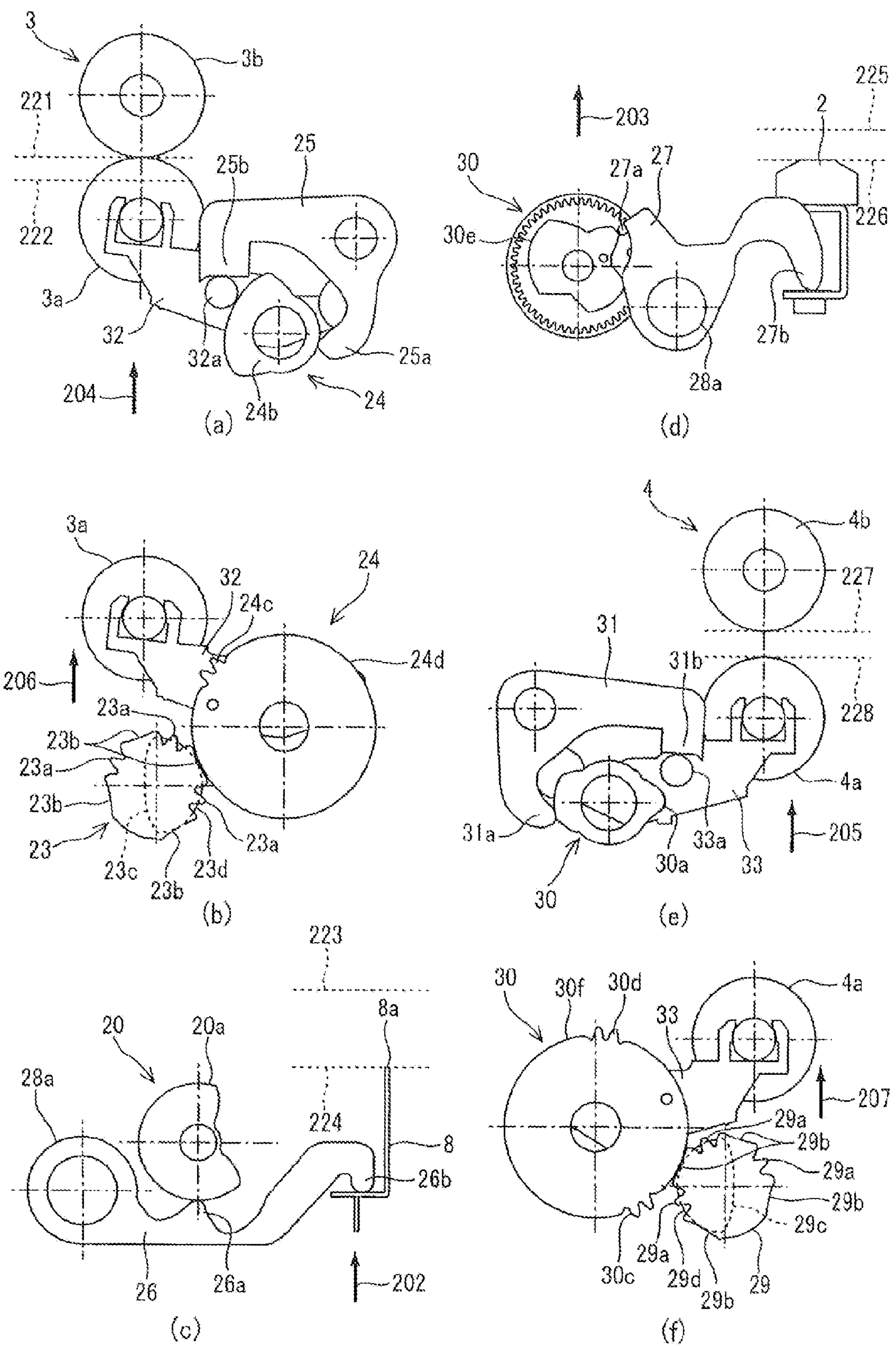
FIG. 27 is an illustration showing respective operable portions of the mode change unit in mode #12 according to the first embodiment.
Figure 28:
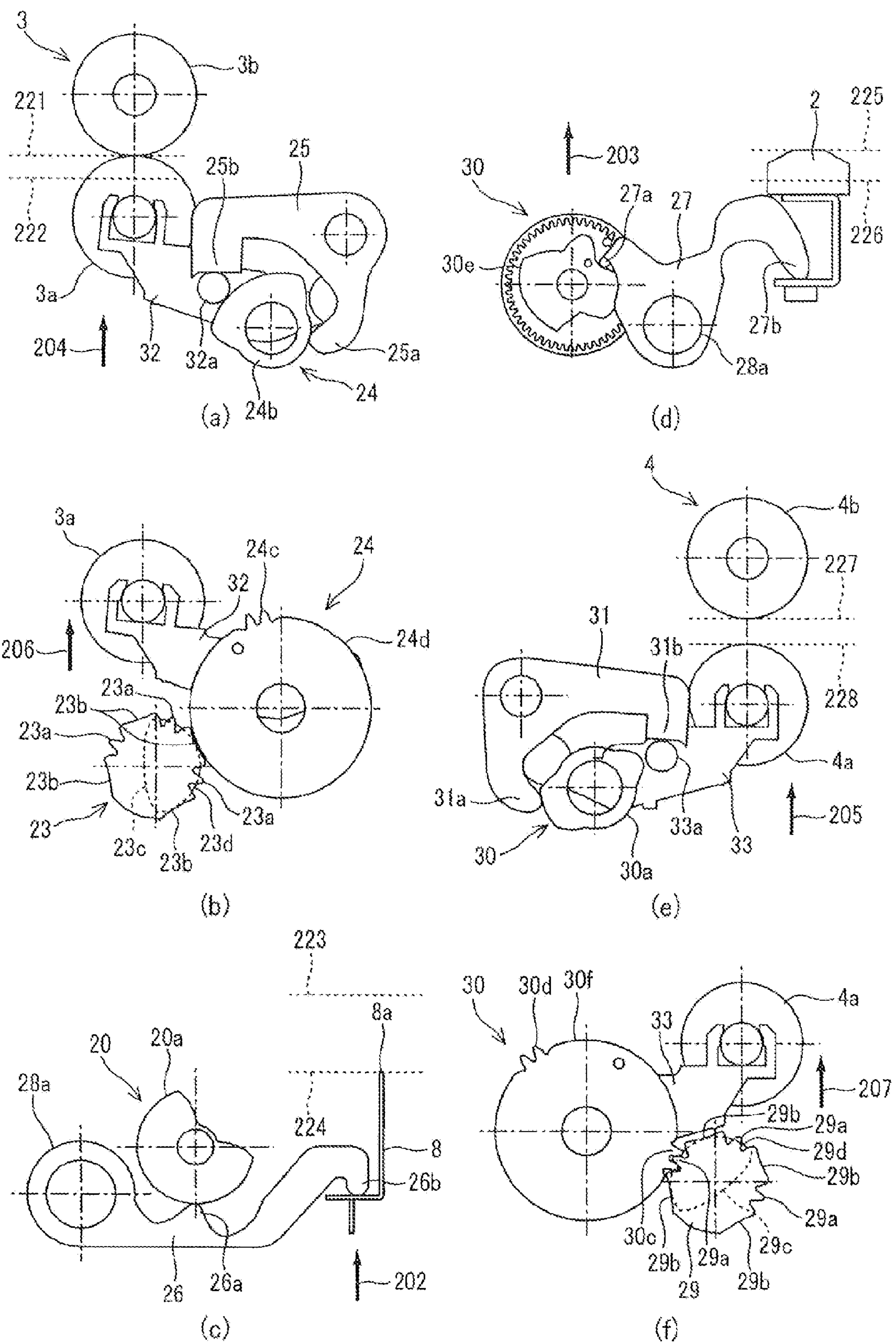
FIG. 28 is an illustration showing respective operable portions of the mode change unit in mode #13 according to the first embodiment.
Figure 29:
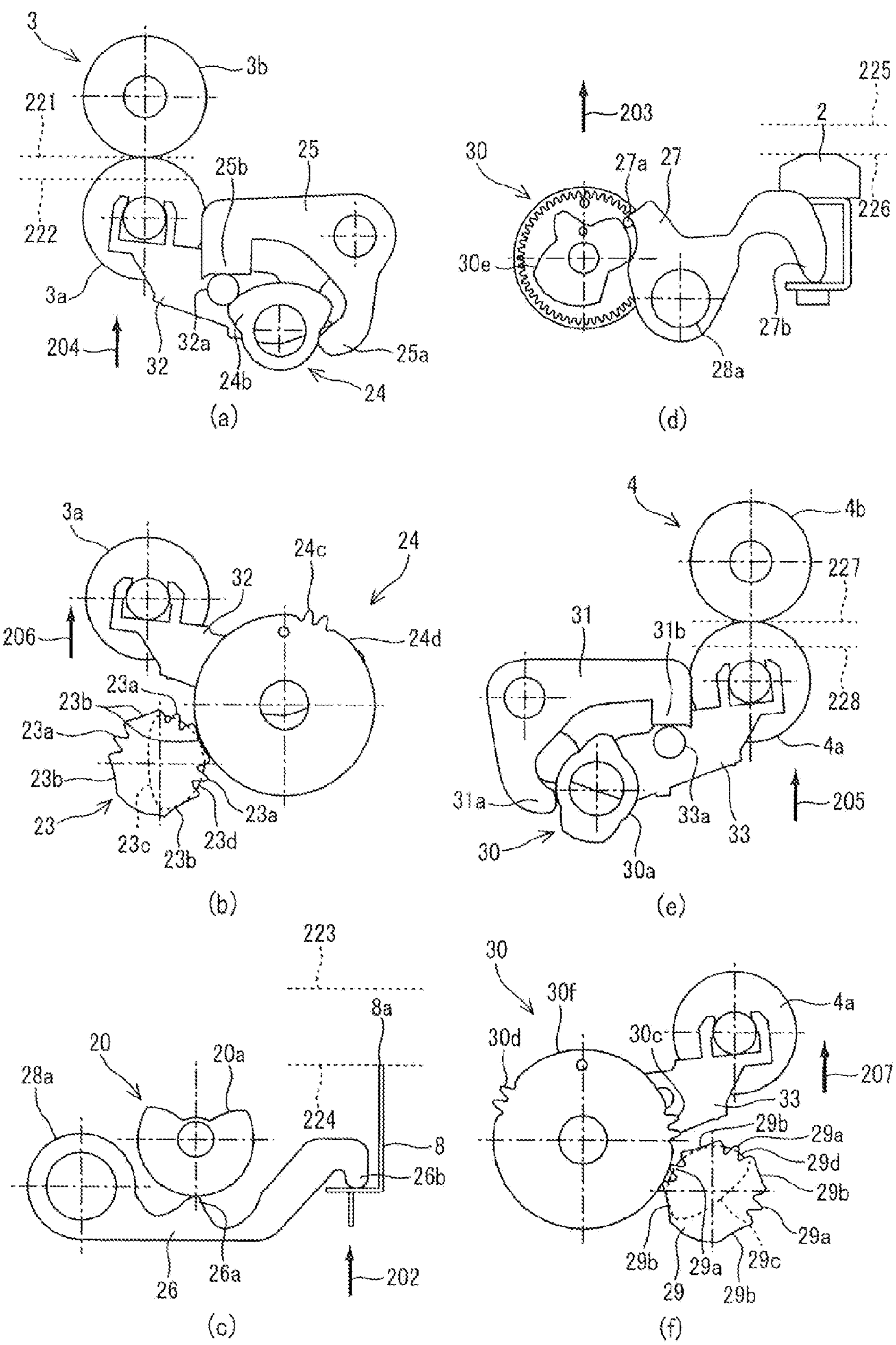
FIG. 29 is an illustration showing respective operable portions of the mode change unit in mode #14 according to the first embodiment.
Figure 30:
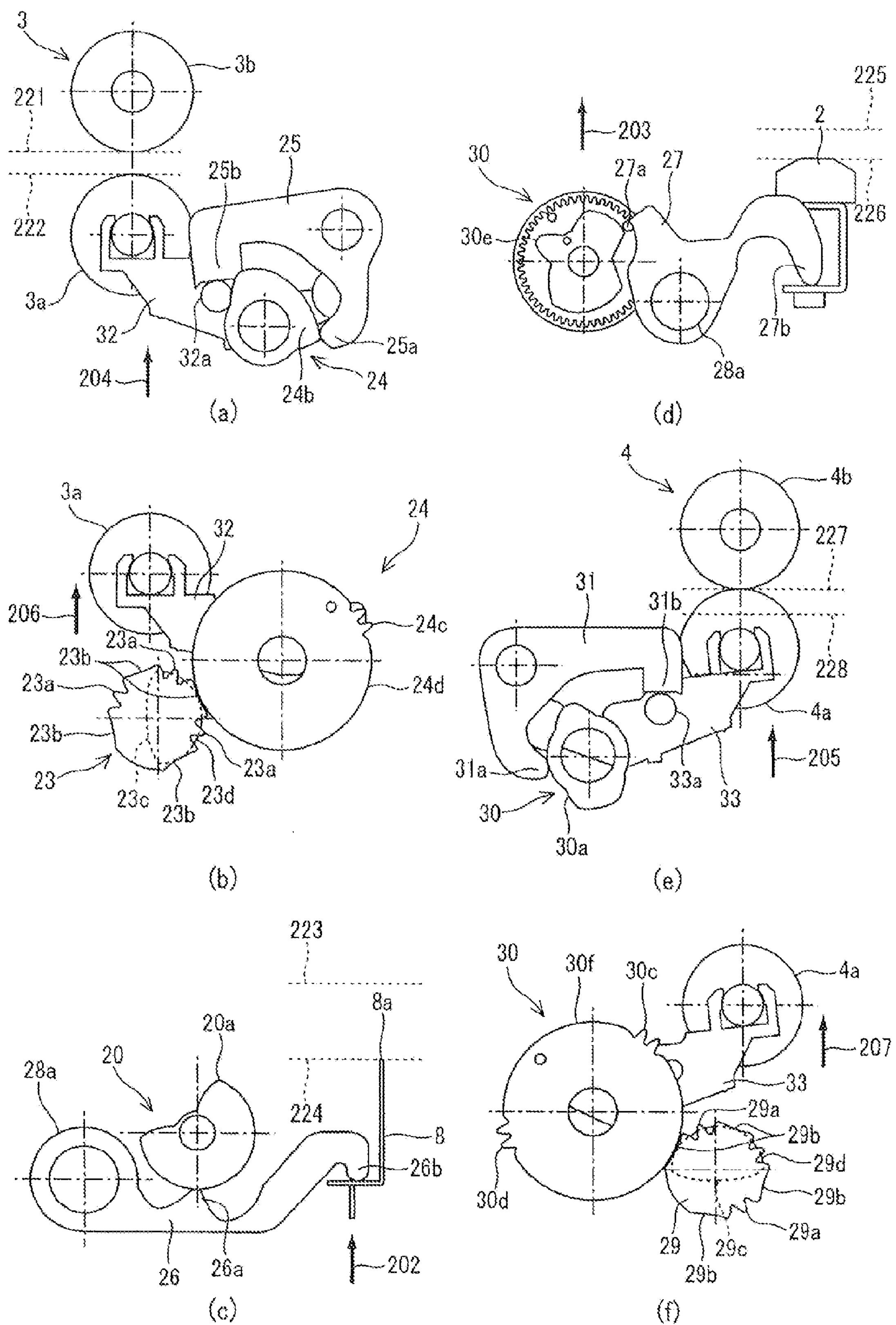
FIG. 30 is an illustration showing respective operable portions of the mode change unit in mode #15 according to the first embodiment.
Figure 31:
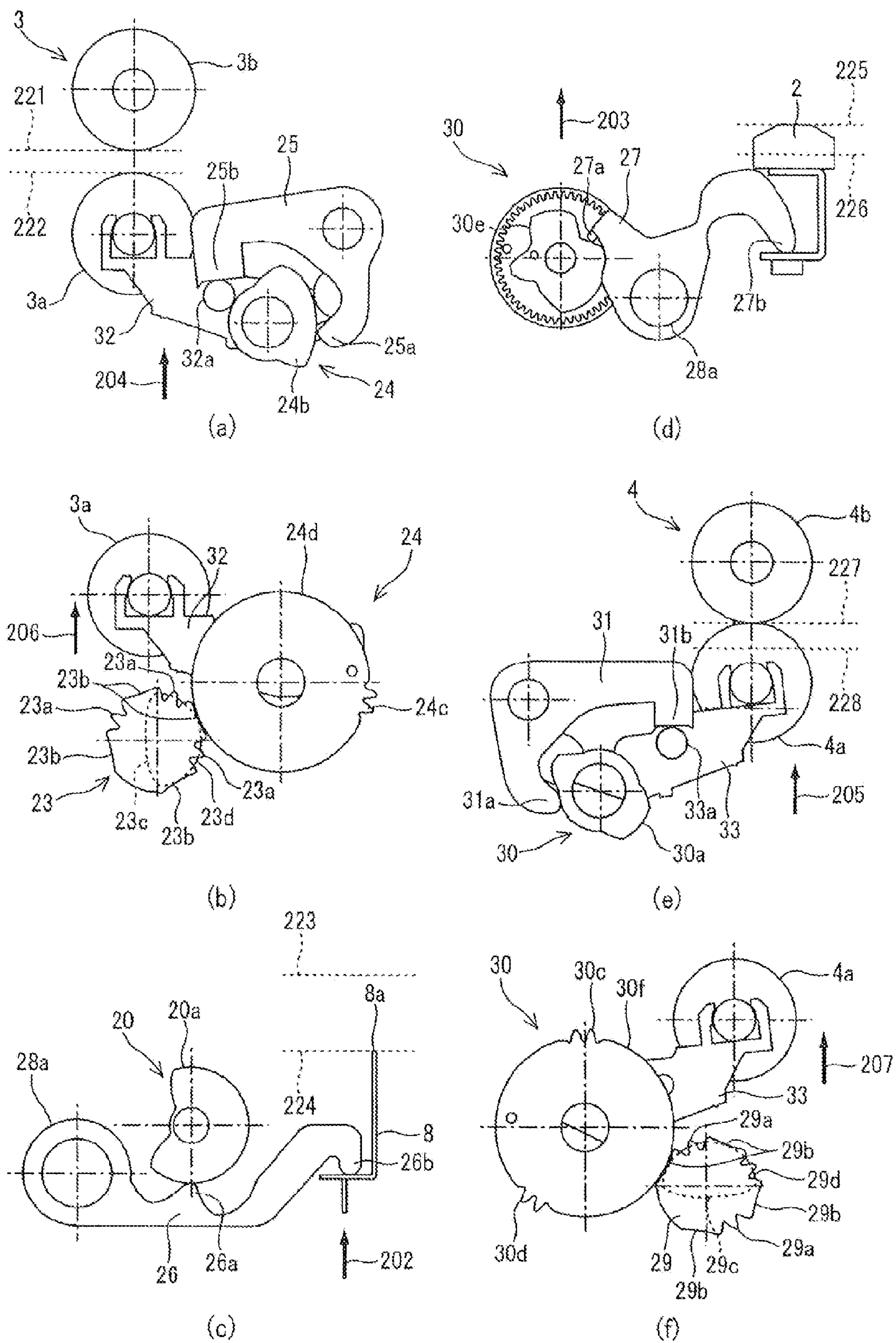
FIG. 31 is an illustration showing respective operable portions of the mode change unit in mode #16 according to the first embodiment.
Figure 32:
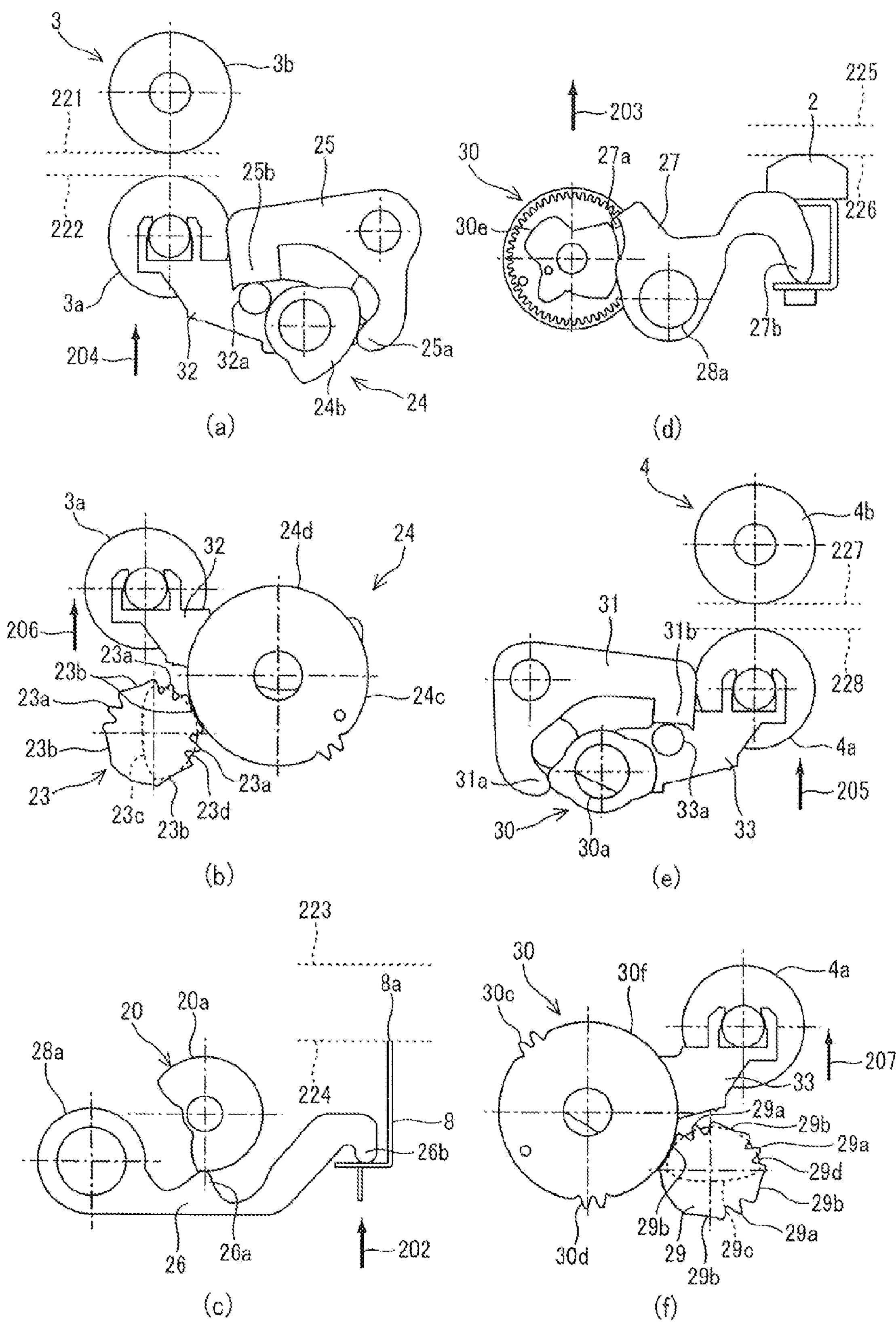
FIG. 32 is an illustration showing respective operable portions of the mode change unit in mode #17 according to the first embodiment.
Figure 33:
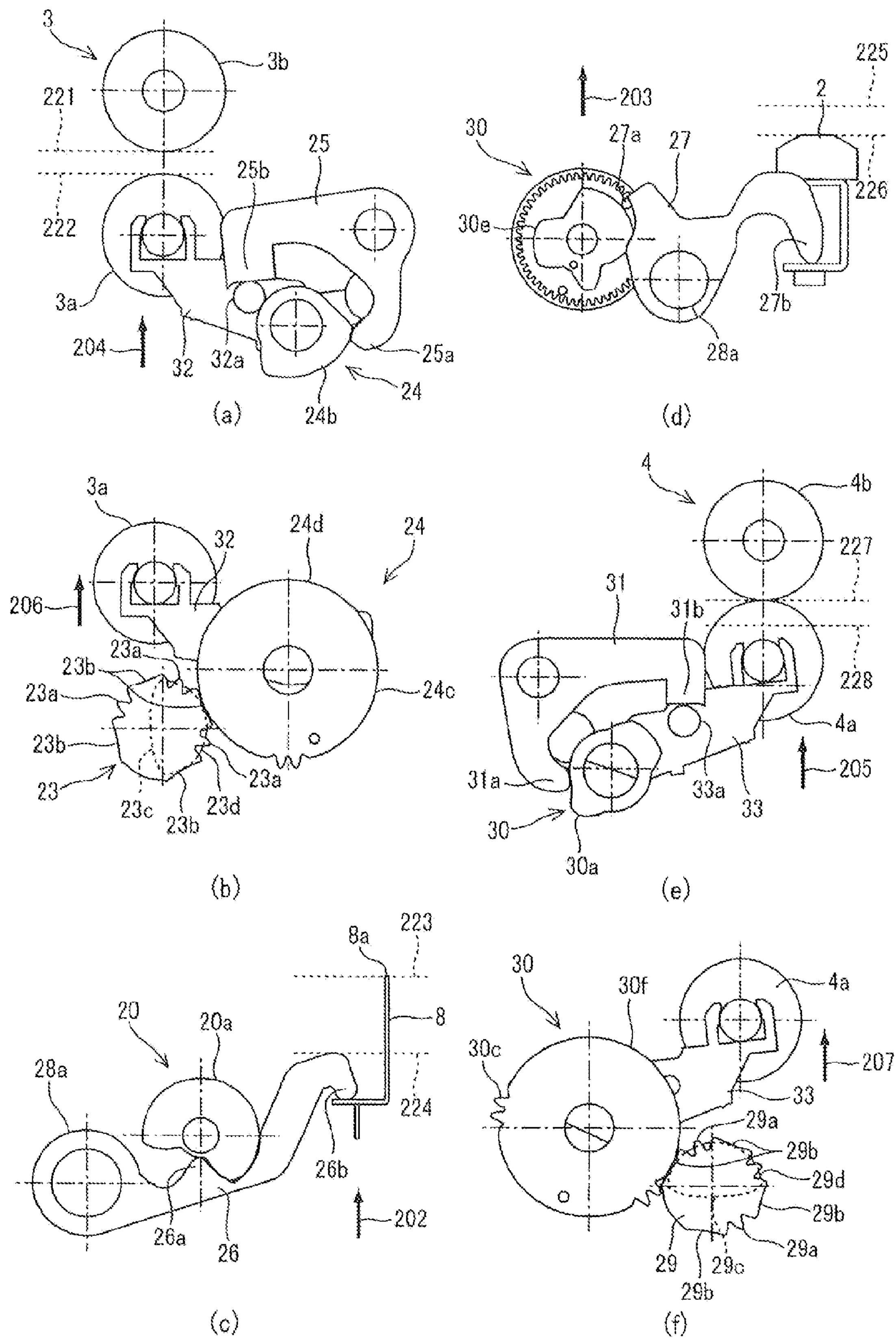
FIG. 33 is an illustration showing respective operable portions of the mode change unit in mode #18 according to the first embodiment.

In the portion (b) in FIG. 26, the front roller gear 24 rotates in the clockwise direction; the tooth portion 24*c* meshes the tooth portion 23*a* of the front camshaft 23; the front camshaft 23 further rotates in the counterclockwise direction in the drawing. At that time, the cam surface 23*d* of the front camshaft 23 is in the effective state, thereby more contracting the front roller spring 9 shown in FIG. 3 urging the front roller bracket 32 in the direction of the arrow 206 than that in the state shown in the portion (b) in FIG. 25. Consequently, stronger contacting force is produced to the front roller pair 3 in comparison with the state shown in the portion (b) in FIG. 25.

The respective operable members described above change their positions and contacting pressures of the respective medium conveyance rollers according to operations such as loading, line feeding, and delivering in relation to printing and according to the medium types such as continuous form sheets, single sheets, and medium's thickness. The variation number of the changes is finite combinations. In this embodiment, the modes as the combinations are eighteen (18) types, and are made of mode groups consecutive for each categorized medium group.

For example, in a case where a continuous form sheet (medium group MG1) is to be printed, the modes #1 through #8 are used, whereas in a case where a single sheet (medium group MG2) is to be printed, the modes #9 through #18 are used. In the first embodiment, the mode #1, the mode #8, the mode #9, the mode #17, and the mode #18 are preliminary modes, and are not used for printing operation. The media are categorized into the medium group MG1 including cardboard paper, and high impact photocopy paper of continuous form sheets, and the medium group MG2 including thin paper, cardboard paper, photocopy paper, and business form of single sheets.

States of respective operable members in the respective modes are described in use of the table in FIG. 34. Where the mode #1 is exemplified, the front roller pair 3 is in a closing state; the contacting pressure of the front roller pair 3 is in a strong state; the shutter 8 is in a closed state; the platen 2 is located at a position in the opposite direction of the arrow 201 with respect to the medium conveyance surface 210 shown in FIG. 3 and is in a state for opening the paper passing route; the rear roller pair 4 is in a contacting state; the contacting pressure of the rear roller pair 4 is in a strong state. With respect to other modes, the states are as shown in the table.

Figure 35:
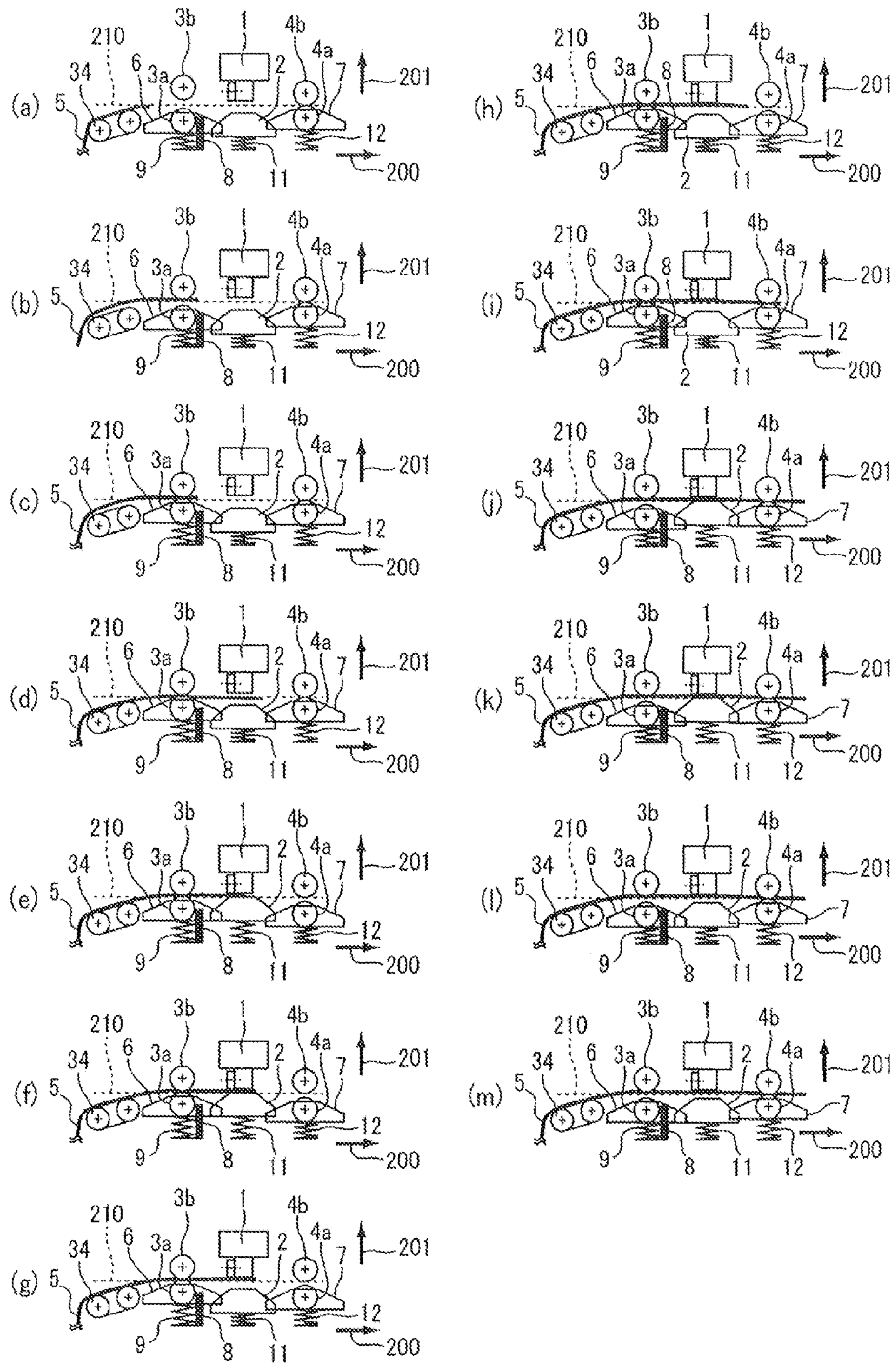
FIG. 35 is an illustration showing a flow for printing medium group MG1 according to the first embodiment.

Relations between the flow from paper loading to printing and paper delivering and the modes used at each stage are described with reference to FIG. 35, FIG. 36, FIG. 37, and FIG. 38. First, operation when the medium group MG1 is to be printed is described. FIG. 35 is an illustration showing a flow for printing the medium group MG1 in the first embodiment, wherein: a portion (a) shows a waiting state; portions (b) to (e) show operation states of paper loading and cueing; portions (f) to (m) show operation states for printing. Detail descriptions are as follows.

The portion (a) in FIG. 35 shows the waiting state, and the apparatus waiting for an instruction of beginning of paper loading. According to the signals from an optoelectrical sensor and switches for detecting the state of the switching lever not shown for switching the single sheets or continuous form sheets set in the printing apparatus 110, the controller 35 sends a signal for using the mode #6 to the mode change unit 102.

In the portion (a) in FIG. 35, the mode #6 indicates a state that the rollers of the front roller pair 3 are separated, that the shutter 8 is opened, that the platen 2 moves in the opposite direction to the arrow 201 in the drawing with respect to the medium conveyance surface 210 to open the paper passing route, that the rollers of the rear roller pair 4 are in contact with each other, and that the contacting pressure of the rear roller pair 4 is weak.

Then, in the portion (b) in FIG. 35, paper feeding begins when the printing apparatus 110 receives a paper loading instruction from the manipulation on a personal computer or by an operator. The mode #6 is used at that time in substantially the same way as at the time of waiting.

In the portion (c) in FIG. 35, when the front end of the fed medium 5 passes by the front roller pair 3, the mode is made shifted from the mode #6 to the mode #5, so that the front roller pair 3 contacts the medium 5 with the weak contacting pressure.

In the portion (d) in FIG. 35, feeding and cueing of the medium is performed, and first, the front roller pair 3 conveys the nipped medium 5 to a desired printing staring position. Then, the front roller pair 3 is made separated at the a time of feeding, and the platen 2 is moved in the opposite direction to the arrow 201 with respect to the medium conveyance surface 210 to open the paper passing route without moving the carriage 1*a*, thereby improving the throughput. Because the paper passing route is opened, the medium 5 can prevent the front end thereof from being folded, so that cueing can be done with high accuracy.

In the portion (e) in FIG. 35, the operating mode is shifted from the mode #5 to the mode #4, thereby beginning printing operation. The mode #4 is a state that the rear roller pair 4 is separated, and that the platen 2 is moved to allow the printing operation.

In the portion (f) in FIG. 35, printing is made in a state before the rollers of the rear roller pair 4 contact to each other, and desired printing operation is done for one line as moving the printing head 1 in the scanning direction.

In the portion (g) in FIG. 35, the operating mode is shifted from the mode #4 to the mode #3. When the medium 5 is fed by a line, the platen 2 moves in the opposite direction to the arrow 201 in the drawing with respect to the medium conveyance surface 210 so as not to be a load, thereby opening the paper passing route.

In the portion (h) in FIG. 35, the state is prior to contacting of the rear roller pair 4 and made with line feeding during the mode #3. Desired printing is made by repeating mode shifting from the mode #4 to the mode #3 or from the mode #3 to the mode #4 until that the front end of the medium 5 passes by the rear roller pair 4.

In the portion (i) in FIG. 35, the operation mode is shifted from the mode #4 to the mode #5 after the medium 5 passes by the rear roller pair 4; the rollers of the rear roller pair 4 are in contact with each other; the front end of the medium 5 is nipped with weak contacting pressure by the rear roller pair 4.

As described above, the front roller pair 3 can prevent the medium 5 from obliquely being fed by nipping the medium 5 until that the front end of the medium 5 is nipped by the rear roller pair 4, and during the line feeding, the platen 2 moves in the opposite direction to the arrow 201 in the drawing with respect to the medium conveyance surface 210, thereby reducing a load exerted to the medium 5 to improve line feeding accuracy and to prevent the medium 5 from being fed obliquely. The medium 5 can prevent the front end from being folded, because the rear roller pair 4 is waiting in a state separating rollers before the front end of the medium 5 is nipped by the rear roller pair 4.

In the portion (j) in FIG. 35, the operation mode is shifted from the mode #5 to the mode #7; the rollers of the front roller pair 3 are separated from each other; the platen 2 is moved in a direction of the arrow 201 in the drawing up to the medium conveyance surface 210. The medium 5 can be prevented from positionally shifted because the rollers of the front roller pair 3 are separated after the front end of the medium 5 is nipped by the rear roller pair 4.

In the portion (k) in FIG. 35, after the rollers of the rear roller pair 4 are in contact with each other, printing is made as a printing state of the mode #7, and line feed is also done with the mode #7. That is, it can be said as printing in a normal state. In a case where the copy number of the continuous form sheets is large or where the paper is extremely thick, it is possible to shift the operation mode from the mode #7 to the mode #6 and to make line feeding by moving the platen 2 in the opposite direction to the arrow 201 in the drawing with respect to the medium conveyance surface 210. This allows reducing the load exerted to the medium 5, thereby preventing the medium 5 from jamming.

The portions (l) and (m) in FIG. 35 show a state where the load is large, such as, e.g., in a case that printing number is large, and line feeding is made during the mode #6. The platen 2 moves in the opposite direction to the arrow 201 in the drawing with respect to the medium conveyance surface 210, and desired printing is made by repeating mode shifting from the mode #6 to the mode #7 or the mode #7 to the mode #6.

Figure 36:
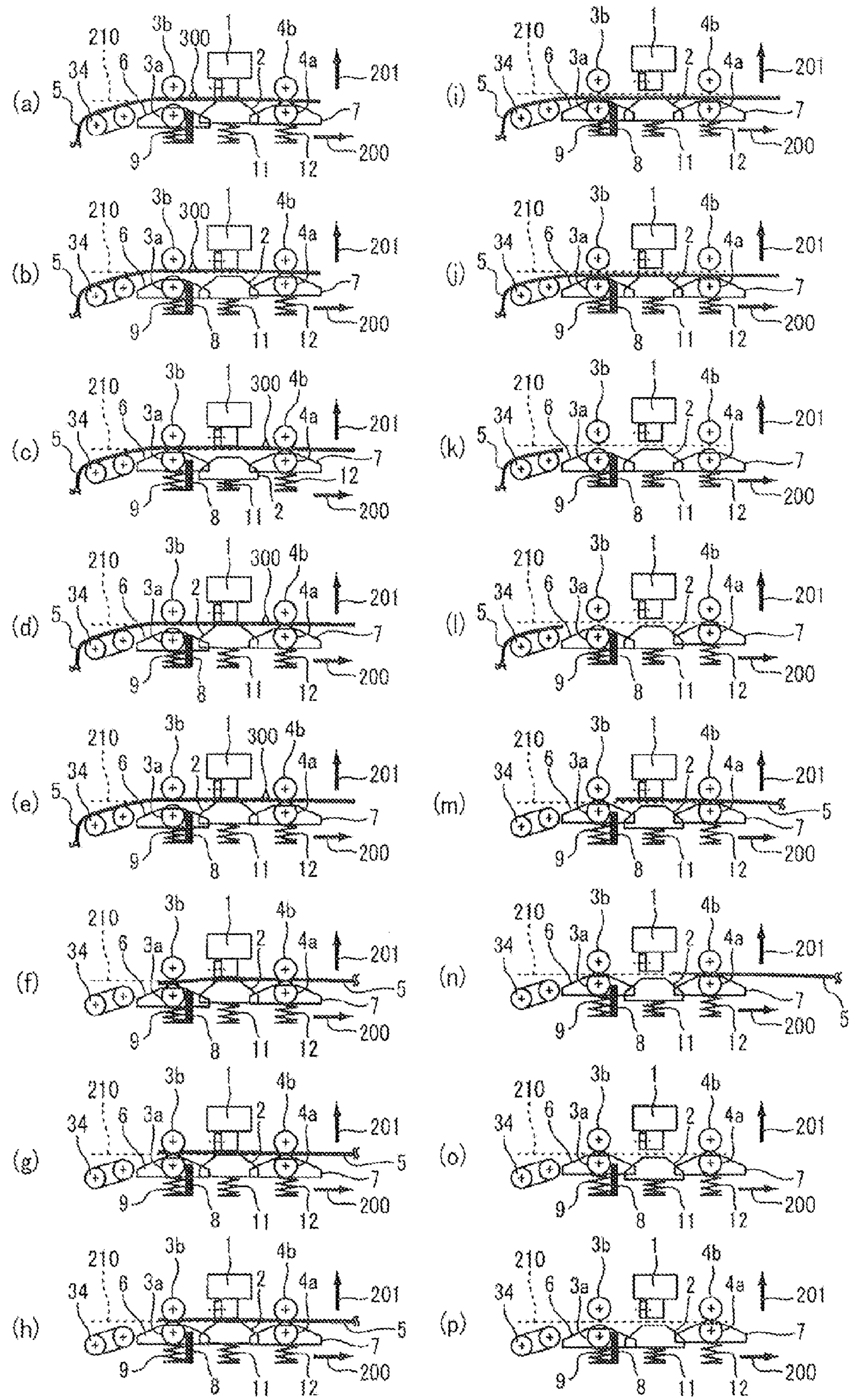
FIG. 36 is an illustration showing a flow for printing medium group MG1 according to the first embodiment.

Next, operation for printing the rear end of the continuous form sheets is described. FIG. 36 is an illustration showing a flow for printing the medium group MG1 according to the first embodiment. In FIG. 36, the portions (a) to (e) show states for operation for passing the perforation given to the continuous form sheet; the portions (f) to (h) show states for printing operation after detection of the rear end of the medium; the portions (j) to (l) show states for delivering the form sheet before detection of the medium rear end; the portions (m) to (p) show states for delivering the form sheet after detection of the medium rear end. Detailed description of each portion is as follows.

First, the operation at a time that a perforation 300 of the continuous form sheet passes the printing unit 101 is described. The portion (a) in FIG. 36 shows the normal printing state (typing and line feeding) of the mode #7, and the perforation 300 is located on an upstream side of the printing unit 101 in the medium conveyance direction. The portions (b) and (c) show the state for shifting the mode #7 to the mode #6 and for line feeding. The platen 2 moves in the opposite direction to the arrow 201 in the drawing with respect to the medium conveyance surface 210, and makes the perforation 300 passing while opening the paper passing route. This reduces the load exerted to the medium 5 during the passage of the perforation 300, thereby preventing the medium 5 from jamming. The portion (d) in FIG. 36 shows operation for shifting the mode #6 to the mode #7 after the perforation 300 of the medium 5 passes by the printing unit 101 and for returning to the normal printing state shown in the portion (k) in FIG. 36.

Next, operation for printing the rear end of the continuous form sheet is described. The portion (f) in FIG. 36 shows a state that the rear end of the medium 5 is detected. The rear end of the medium 5 is detected by a sensor located on an upstream side of the front roller pair 3 in the medium conveyance direction. When the rear end of the medium 5 is detected, the operation mode is shifted from the mode #7 to the mode #2 as shown in the portion (g) in FIG. 36. The mode #2 is a state that the rollers of the front roller pair 3 are contacting to each other and that the rear end of the medium 5 is nipped with weak contacting pressure. The rear roller pair 4 is nipping the medium 5 with strong contacting pressure. With those states, the apparatus performs printing operation (typing and line feeding) to make desired printing. When the rear end of the medium 5 is got off from the tractor 34, the apparatus can prevent the medium 5 from being obliquely fed due to the load when the printing head 1 moves in the scanning direction, because the front roller pair 3 nips the medium 5.

Next, operation for delivering the medium 5 before detecting the rear end of the medium 5 is described. The operation mode, or printing mode before detection of the rear end of the medium 5 is the mode #4, the mode #5, or the mode #7, and the operation mode is shifted from the respective modes to the mode #8 upon reception of the instruction for delivery during printing in the respective modes.

The portions (i), (j), and (k) in FIG. 36 show the state of the mode #8. The mode #8 is a state that the rollers of the front roller pair 3 and the rear roller pair 4 are separated, and that the platen 2 moves in the opposite direction to the arrow 201 in the drawing with respect to the medium conveyance surface 210 to open the paper passing route. Under this state, the tractors 34 are driven to escape the medium 5 to the position of the portion (k) in FIG. 36 and then to stop the escaping. Because the rollers of the front roller pair 3 and the rear roller pair 4 are separated, and because the platen 2 moves in the opposite direction to the arrow 201 in the drawing with respect to the medium conveyance surface 210 to open the paper passing route, the apparatus can prevent the medium 5 from jamming during delivery. After the medium 5 is made escaping, the operation mode is shifted from the mode #8 to the mode #6, and enters a waiting state as shown in the portion (l) in FIG. 36.

Next, the delivery operation of the medium 5 after detection of the rear end of the medium 5 is described. The printing mode, or the operation mode after detection of the rear end of the medium 5 is the mode #2, and when receiving the instruction for delivery during printing operation, the operation mode is shifted from the mode #2 to the mode #5.

The portions (m), (n), and (o) in FIG. 36 show the state of the mode #5. The mode #5 is a state that the rollers of the front roller pair 3 and the rear roller pair 4 are in contact with each other with weak contacting pressure and nipping the medium 5, and that the platen 2 moves in the opposite direction to the arrow 201 in the drawing with respect to the medium conveyance surface 210 to open the paper passing route. Under this state, the front roller pair 3 and the rear roller pair 4 are driven to deliver the medium 5 completely as shown in the portion (o) in FIG. 36, and stop the delivery thereafter. Because the platen 2 is moved in the opposite direction to the arrow 201 in the drawing with respect to the medium conveyance surface 210, the apparatus can prevent the medium 5 from jamming. After the medium 5 is escaped, the operation mode is shifted from the mode #5 to the mode #6, and the apparatus enters in a waiting state as shown in the portion (p) in FIG. 36.

Figure 37:
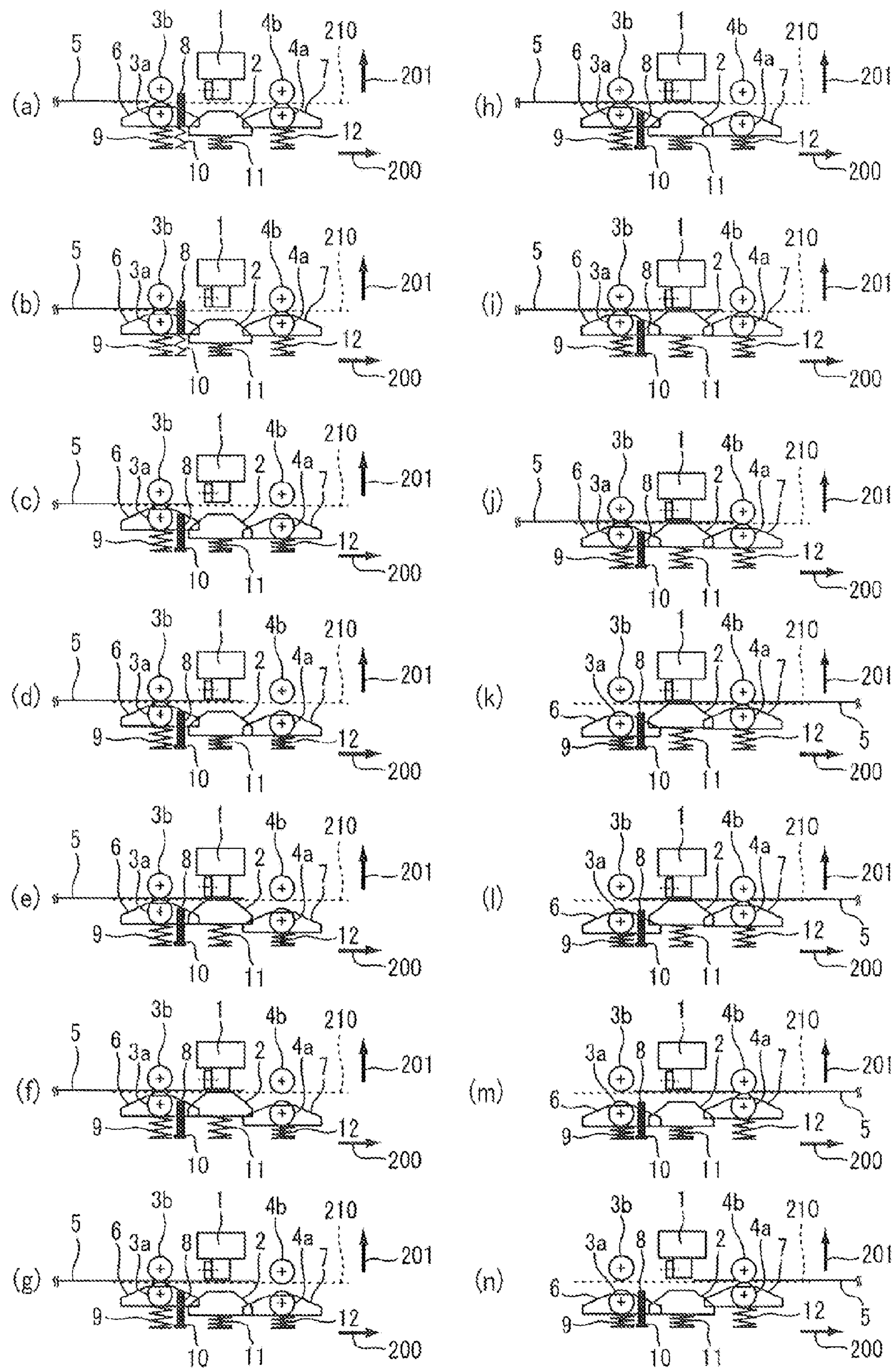
FIG. 37 is an illustration showing a flow for printing medium group MG2 according to the first embodiment.

Next, operation for printing the medium group MG2 is described. FIG. 37 is an illustration showing a flow for printing the medium group MG2 according to the first embodiment. In FIG. 37, the portion (a) shows a waiting state; the portions (b) to (e) show a state for operation of single sheet loading; the portions (f) to (n) show a state of operation of single sheet printing. Detailed descriptions of respective portions are as follows.

The portion (a) in FIG. 37 shows a state of the mode #10 waiting for the medium 5 for printing the medium group MG2. The mode #10 is a state that the rollers of the front roller pair 3 contact to each other with weak contacting pressure, that the shutter 8 moves in the direction of the arrow 201 in the drawing with respect to the medium conveyance surface 210 as to close the paper passing route, that the platen 2 moves in the opposite direction to the arrow 201 with respect to the medium conveyance surface 210, and that the rollers of the rear roller pair 4 contact to each other with strong contacting pressure. In a case of printing the single sheet medium of the medium group MG2, a skew correction of the medium 5 is made prior to printing.

The portion (b) in FIG. 37 shows a state that the operator inserts the medium 5 until bumping the front roller pair 3, that the sensor disposed on an upstream side of the front roller pair 3 in the medium conveyance direction detects the medium 5, and that the front roller pair 3 conveys the bumped medium 5 with weak contacting pressure in the medium conveyance direction to correct skew of the medium 5 by bumping the front end of the medium 5 to the shutter 8. The medium 5 is corrected to align the medium 5 itself parallel to the plan of the shutter 8 because held with weak contacting pressure by the front roller pair 3.

In the portion (c) in FIG. 37, the operation mode is shifted from the mode #10 to the mode #12 to convey and cue the medium 5. The mode #12 is a state that the rollers of the front roller pair 3 are contacted to each other with strong contacting pressure, that the shutter 8 moves in the opposite direction to the arrow 201 in the drawing with respect to the medium conveyance surface 210 as to open the paper passing route, that the platen 2 moves in the opposite direction to the arrow 201 with respect to the medium conveyance surface 210, and that the rollers of the rear roller pair 4 are separating. In the portion (d) in FIG. 37, to do single sheet conveying and cueing, the medium 5 is conveyed in the medium conveyance direction by means of the front roller pair 3, and is set at a desired printing starting position. The apparatus can prevent the medium 5 from being folded at the front end because the platen 2 is moved in the opposite direction to the arrow 201 in the drawing with respect to the medium conveyance surface 210 when the medium 5 is loaded.

In the portion (e) in FIG. 37, the operation mode is shifted from the mode #12 to the mode #13 for printing. The mode #13 is a state that the rollers of the front roller pair 3 are contacted to each other with strong contacting pressure, that the platen 2 moves in the direction of the arrow 201 in the drawing up to the medium conveyance surface 210, and that the rollers of the rear roller pair 4 are separated from each other. In the portion (f) in FIG. 37, desired printing is made by driving the printing head 1 as moving the printing head 1 in the scanning direction before the rollers of the rear roller pair 4 come into contact. In the portion (g) in FIG. 37, the operation mode is shifted from the mode #13 to the mode #12. The mode #12 is, as described above, the state that the rollers of the front roller pair 3 are contacted to each other with strong contacting pressure, that the shutter 8 moves in the opposite direction to the arrow 201 in the drawing with respect to the medium conveyance surface 210 as to open the paper passing route, that the platen 2 moves in the opposite direction to the arrow 201 with respect to the medium conveyance surface 210, and that the rollers of the rear roller pair 4 are separating.

In the portion (h) in FIG. 37, the medium 5 is fed by line under a state before the rollers of the rear roller pair 4 contact to each other. The apparatus can prevent the medium 5 from obliquely fed because the medium 5 is fed by line while the platen 2 is moved in the opposite direction to the arrow 201 in the drawing with respect to the medium conveyance surface 210 until that the front end of the medium 5 is nipped by the rear roller pair 4. Desired printing is obtained by repeating shifting operation from the mode #12 to the mode #13 until that the medium 5 reaches the rear roller pair 4.

Next, operation when the medium 5 reaches the rear roller pair 4 is described. In the portion (i) in FIG. 37, when the medium 5 reaches the rear roller pair 4 by means of the front roller pair 3, the operation mode is shifted from the mode #12 to the mode #11. The mode #11 is a state that the rollers of the front roller pair 3 are contacted to each other with strong contacting pressure, that the platen 2 moves in the direction of the arrow 201 up to the medium conveyance surface 210, and that the rollers of the rear roller pair 4 are contacting to each other with strong contacting pressure. In the portion (j) in FIG. 37, the rear roller pair 4 is in a printing state in the mode #11 after contacting, and the apparatus uses the mode #11 to make printing (typing and line feeding) until that the rear end of the medium 5 passes the sensor located on the upstream side of the front roller pair 3 in the medium conveyance direction.

Next, operation when the rear end of the medium 5 passes the sensor located on the upstream side of the front roller pair 3 in the medium conveyance direction, is described. In the portion (k) in FIG. 37, the operation mode is shifted from the mode #11 to the mode #16. The mode #16 is a state that the rollers of the front roller pair 3 are separated, that the platen 2 is moved in the direction of the arrow 201 in the drawing up to the medium conveyance surface 210, and that the rollers of the rear roller pair 4 are contacted to each other with strong contacting pressure. The portion (l) in FIG. 37 shows a printing state after the detecting the rear end of the medium 5.

In the portion (m) in FIG. 37, to make line-feeding of the medium 5, the operation mode is shifted from the mode 316 to the mode #15. The mode #15 is a state that the rollers of the front roller pair 3 are separated, that the platen 2 is moved in the opposite direction to the arrow 201 in the drawing with respect to the medium conveyance surface 210, and that the rollers of the rear roller pair 4 are contacted to each other with strong contacting pressure.

The portion (n) in FIG. 37 shows a line feeding state after detecting the rear end of the medium 5. When the rear end of the medium 5 is got off from the front roller pair 3, the apparatus can prevent the medium 5 from obliquely fed because line feeding is made where the platen 2 is moved in the opposite direction to the arrow 201 in the drawing with respect to the medium conveyance surface 210. After detection of the rear end of the medium 5, desired printing is made by repeating the mode shifting from the mode #16 to the mode #15 and from the mode #15 to the mode #16.

Figure 38:
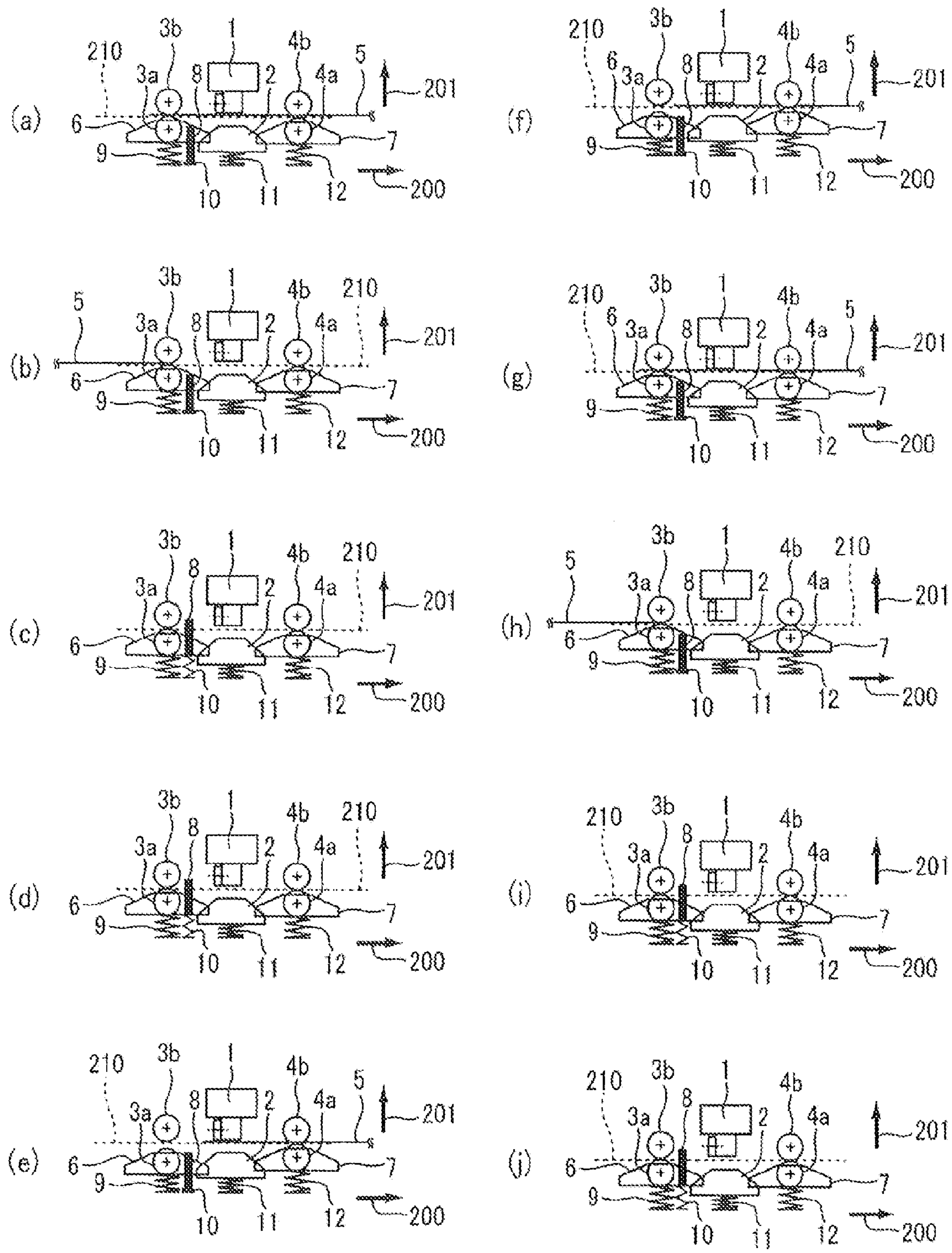
FIG. 38 is an illustration showing a flow for printing medium group MG2 according to the first embodiment.

Next, delivery operation for the medium 5 in the case of the medium group MG2is described. The portions (a) to (d) in FIG. 38 illustrate delivery where the medium 5 is nipped with the front roller pair 3 and the rear roller pair 4. In the portion (a) in FIG. 38, for printing of the medium 5 nipped with the front roller pair 3 and the rear roller pair 4, the operation mode is shifted from the mode 11 to the mode 14 since the current mode is the mode 11. The mode 14 is a state that the rollers of the front roller pair 3 are contacted to each other with strong contacting pressure, that the platen 2 moves in the opposite direction to the arrow 201 with respect to the medium conveyance surface 210, and that the rollers of the rear roller pair 4 are contacting to each other with strong contacting pressure.

The portion (b) in FIG. 38 shows a delivery state during the mode 14. In the state that the medium 5 is nipped with the front roller pair 3 and the rear roller pair 4, the platen 2 is moved in the opposite direction to the arrow 201 in the drawing with respect to the medium conveyance surface 210, thereby delivering the medium 5. This allows reducing the load exerted to the medium 5, thereby preventing the apparatus from subjecting to jamming during delivery operation. The portions (c) and (d) in FIG. 38 show a mode shifting state from the waiting state to the mode #10 after delivering the medium 5.

The portions (e) and (f) in FIG. 38 show the delivery operation in a case that printing is made under the mode #16 after the rear end of the medium 5 passes the sensor disposed on an upstream of the front roller pair 3 in the medium conveyance direction. In the portion (e) in FIG. 38, the operation mode is shifted from the mode #16 to the mode #15. The mode #15 is a state that the rollers of the front roller pair 3 are separating from each other, that the platen 2 moves in the opposite direction to the arrow 201 with respect to the medium conveyance surface 210, and that the rollers of the rear roller pair 4 are contacting to each other with strong contacting pressure.

In the portion (f) in FIG. 38, the medium 5 is delivered in the opposite direction to the medium conveyance direction. During this process, the rear end of the medium 5 passes the sensor disposed on an upstream of the front roller pair 3 in the medium conveyance direction. When the sensor detects the medium 5, the operation mode is shifted from the mode #15 to the mode #14 at the portion (g) in FIG. 38. The mode #14 is a state that the rollers of the front roller pair 3 are contacting to each other with strong contacting pressure, that the platen 2 moves in the opposite direction to the arrow 201 with respect to the medium conveyance surface 210, and that the rollers of the rear roller pair 4 are contacting to each other with strong contacting pressure.

In the portion (h) in FIG. 38 shows a state the medium 5 is completely ejected in use of the mode #14. The rollers of the front roller pair 3 are separated until the rear end of the medium 5 passes the front roller pair 3, and the medium 5 is ejected while the platen 2 is moved in the opposite direction to the arrow 201 with respect to the medium conveyance surface 210, thereby preventing the medium 5 from being folded at the rear end and from jamming.

The portions (i) and (j) in FIG. 38 show a state that the operation mode is shifted from the mode #14 to the mode #10 as to change to the waiting mode after the medium 5 is completely ejected. The home position mode described above is an intermediate position between the mode #7 and the mode #8 in mode shifting among the all modes, regardless the printing operation for the medium group MG1 or the medium group MG2. In this embodiment, the positions of the respective modes are managed with distances from the home position mode or, e.g., pulse numbers given to the motor. The home position mode is confirmed at each prescribed time or at error occurrences so as not to deviate the position of the home position mode during use of a long period of time. More specifically, the home position mode is confirmed after each printing completion of one page as a prescribed time, and the apparatus corrects the reference positions of the platen 2, the front roller pair 3, the rear roller pair 4, and the shutter 8.

Figure 39:
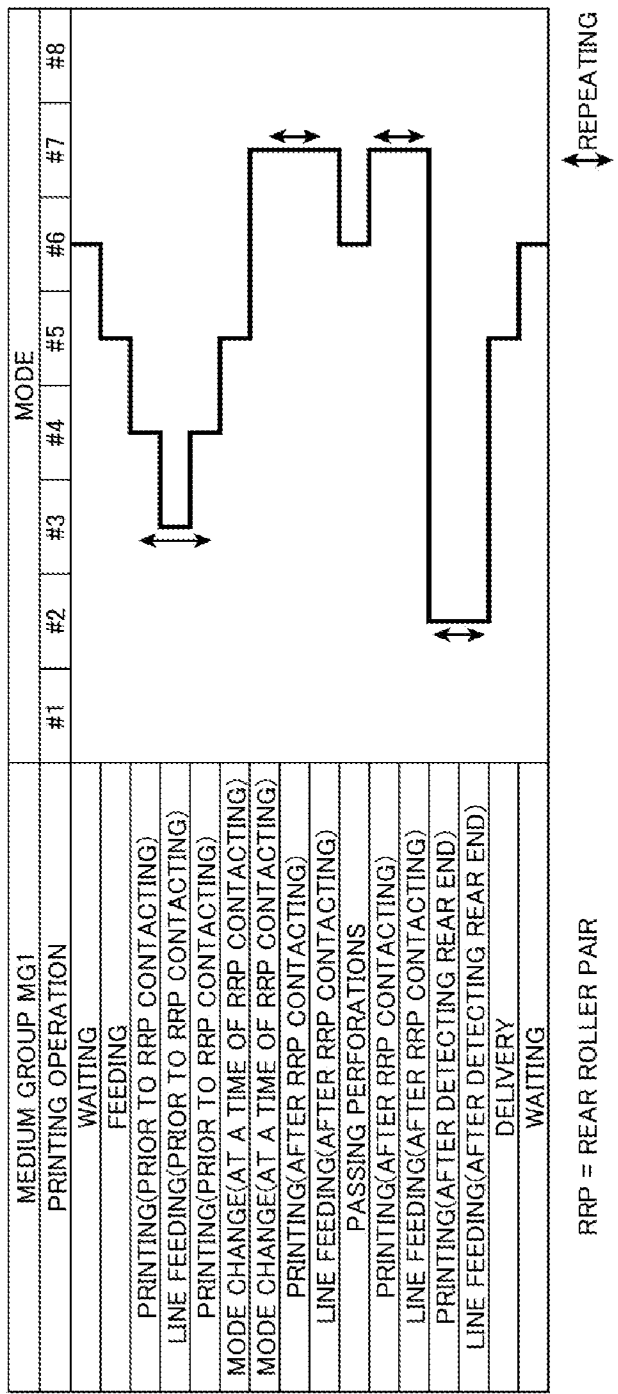
FIG. 39 is a table showing shifting of the modes when printing medium group MG1 according to the first embodiment.
Figure 40:
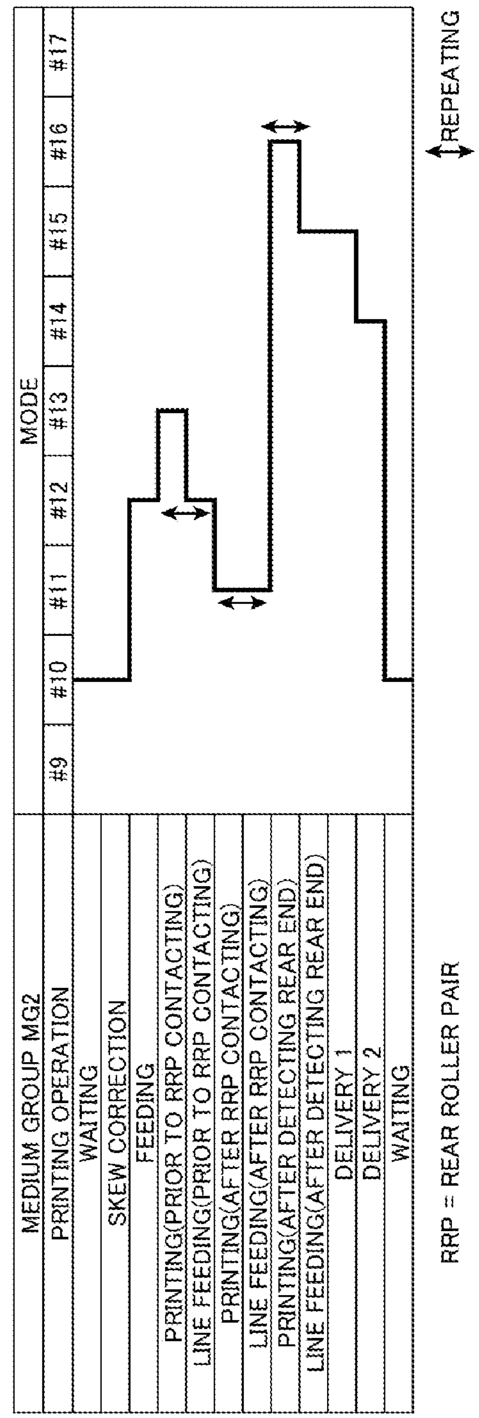
FIG. 40 is a table showing shifting of the modes when printing medium group MG2 according to the first embodiment.

FIG. 39 is a table showing shifting of the modes when the apparatus prints the medium group MG1 according to the first embodiment, and shows mode shifting of a series of a flow from the waiting state in a normal state to printing operation for the medium group MG1 and a flow returning to the waiting state at the completion of printing. FIG. 40 is a table showing shifting of the modes when the apparatus prints the medium group MG2 according to the first embodiment, and shows mode shifting of a series of a flow from the waiting state in a normal state to printing operation for the medium group MG2 and a flow returning to the waiting state at the completion of printing.

As described above, printing for the medium group M2 is described from the waiting state through the skew correction of the medium to the delivery of the medium. During loading of the medium, the rollers of the front roller pair 3 are separated from each other, and the platen 2 is moved in the opposite direction to the arrow 201, so that the paper passing route can be opened without moving the carriage 1*a*, thereby improving its throughput. Although in the prior art the interval between the printing head and the platen is widened by moving the medium following roller over the platen slope, no platen slope is required with this apparatus, and the printing apparatus therefore can be made more compact.

The printing apparatus can prevent the medium from being folded at the front end and from jamming because of opening of the paper passing route, and further can cue with high accuracy. The printing apparatus can prevent the medium 5 from obliquely fed by keeping nipping of the medium 5 at the front roller pair 3 until that the medium 5 is nipped by the rear roller pair 4, and during the line-feeding, by moving the platen 2 in the opposite direction to the arrow 201 with respect to the medium conveyance surface 210, the apparatus can reduce the load exerted to the medium 5 to improve line feeding accuracy and to prevent the medium 5 from being obliquely fed. Because the rollers of the rear roller pair 4 are separated while waited, the apparatus can prevent the medium 5 from being folded at the front end.

After the medium 5 is nipped by the rear roller pair 4, the medium 5 is prevented from positionally shifted because the rollers of the front roller pair 3 are separating. With the medium group MG1, the medium 5 is prevented from obliquely fed due to the load at a time that the printing head 1 moves in the scanning direction because the front roller pair 3 keeps nipping of the medium 5 when the rear end of the medium 5 is got off from the tractor 34. The controller 35 shown in FIG. 1 outputs and instructs the mode to be shifted as an electrical signal to the mode change unit 102, so that control of mode shifting can be made easily.

Because the modes are shifted by means of the mode change motor and the cams, the structures for switching the rollers of the medium conveyance roller pairs to be contacting to or separating from each other, for two stage switching of the contacting pressure of the medium conveyance roller pair to be strong or weak, for switching the distance between the printing head and the platen to be close or remote, and for switching the shutter to be open or closed, can be made in a more simplified manner.

As described above, in the first embodiment, the apparatus can obtain advantages such as improved throughputs of the printing operation because optimum operational positions for respective operational members including the platen are selected and because no movement of the carriage is required during paper loading by ensuring the medium conveyance route. The printing apparatus also can obtain advantages to reduce the apparatus size because no slope arranged at each end of the platen is required where selecting optimum operational positions of the operational members including the platen and where being capable of switching the interval amount between the printing head and the platen. This printing apparatus also has advantages to print various media because corresponding to the rear end printing in the medium conveyance direction of the continuous form sheets and because preventing the single sheets from obliquely fed where selecting contacting pressure of the medium conveyance roller pair and optimum operational positions of the operational members including the shutter.

This printing apparatus has advantages that printing quality is made higher, because the front end and the rear end of the medium are prevented from being folded in the medium conveyance direction, because the medium is prevented from positionally shifted, because the line feeding can be improved with higher accuracy, and because the apparatus can perform cueing with high accuracy and prevent paper jamming from occurring, where selecting optimum operational positions of the respective operational members. Moreover, the apparatus can make the mechanism thereof simplified by switching the modes with the single mode change motor and the cams. The apparatus also has advantages that can perform various controls easily according to the types of the medium.

Second Embodiment

The fundamental structure of the second embodiment is substantially the same as that in the first embodiment except a structure of the slit disc 18A and a control system, so that a duplicated description is omitted by providing the same reference numbers.

Figure 41:
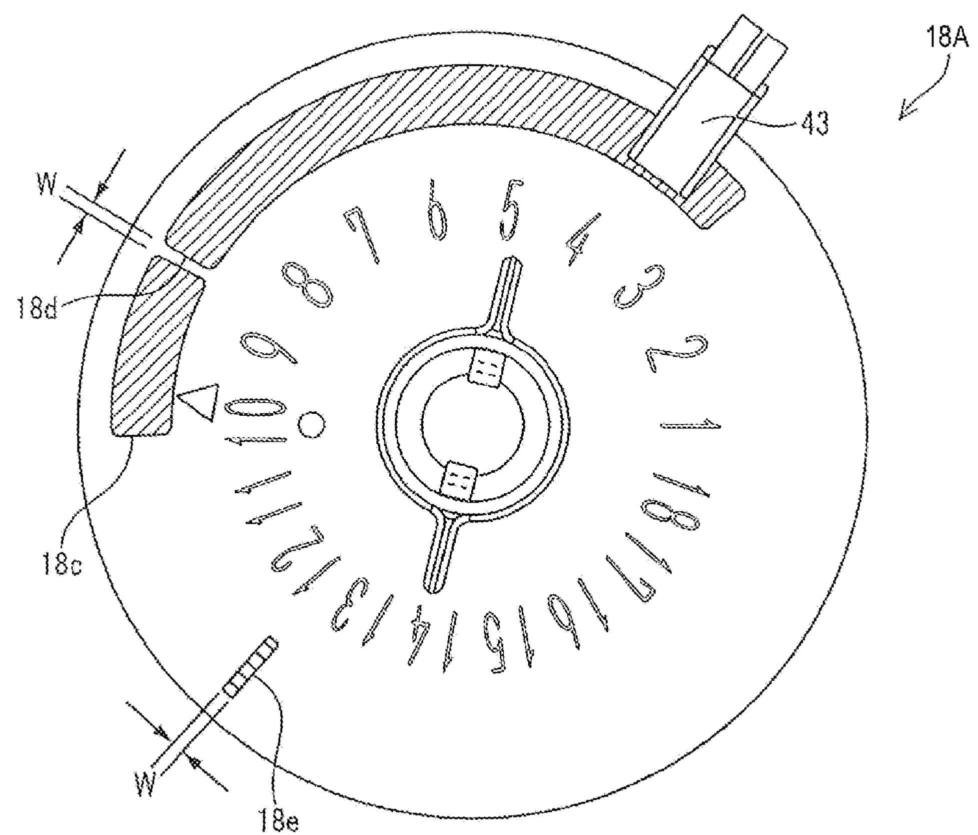
FIG. 41 is a plan view showing a slit disc according to a second embodiment of the invention.

FIG. 41 is a plan view showing a slit disc 18A according to the second embodiment. In FIG. 41, the slit disc 18 serving as a state detecting means for detecting the reference position mode includes a slit boundary 18*c*, a slit rib 18*d*, and a slit hole 18*e*. The slit rib 18*d* has a structure to be positioned at a location detected by a transmission sensor 43 at a time where the operation mode of the printing apparatus 110 is the mode #6. The slit hole 18*e* has a structure to be positioned at a location detected by a transmission sensor 43 at a time where the operation mode of the printing apparatus 110 is the mode #10. The slit rib 18*d* and the slit hole 18*e* have the width W, respectively. The controller 35 shown in FIG. 35 outputs an instruction signal for designating the mode to be shifted based on the reference position mode detected by the slit disc 18, thereby shifting the operation mode to the desired mode.

In operation, according to the second embodiment, the home position mode according to the first embodiment is set as a first home position mode or namely a first reference position mode, and in addition to the first home position mode, the printing apparatus has a second home position mode or namely a second reference position mode. The second home position mode is set as near the mode at the completion of the printing operation in the mode shifting at each group of the medium types, and the second home position mode can be selected according to the medium type.

It is unknown that the printing apparatus 110 is located at which mode when the power is turned on; the way to shift to the first home position mode is different according to the state of on and off of the transmission sensor 43 at a time of the power turned on (where the transmission sensor 43 is turned on in a shielded state whereas turned off in an open state).

In FIG. 41, for example, where the mode of the printing apparatus 110 is in a state of the modes #8 to #18 when the power is turned on and where the transmission sensor is turned on, the mode change motor 13 shown in FIG. 4 rotates to rotate the slit disc 18A in the counterclockwise direction when the power is turned on, and the transmission sensor 43 detects the slit boundary 18*c* or the slit hole 18*e* then to enter in the turned-off state.

Then, the slit disc 18 is rotated in the counterclockwise direction for or more of the hole width W. If the transmission sensor 43 is in the turned off state, the location detected by the transmission sensor 43 is the slit boundary 18*c*, and the printing apparatus 110 recognizes the first home position mode. On the other hand, if the transmission sensor 43 is in the turned on state, the location detected by the transmission sensor 43 is the slit hole 18*e*, and the slit disc 18A is further rotated in the counterclockwise direction to seek the slit boundary 18*c*.

Where the mode of the printing apparatus 110 is in a state of the modes #1 to #7 when the power is turned on at the printing apparatus 110 and where the transmission sensor is turned off, the mode change motor 13 shown in FIG. 4 rotates to rotate the slit disc 18A in the clockwise direction when the power is turned on, and the transmission sensor 43 detects the slit boundary 18*c* or the slit rib 18*d* then to enter in the turned-on state.

Then, the slit disc 18 is rotated in the clockwise direction for or more of the hole width W. If the transmission sensor 43 is in the turned on state, the location detected by the transmission sensor 43 is the slit boundary 18*c*, and the printing apparatus 110 recognizes the first home position mode. On the other hand, if the transmission sensor 43 is in the turned off state, the location detected by the transmission sensor 43 is the slit rib 18*d*, and the slit disc 18A is further rotated in the clockwise direction to seek the slit boundary 18*c*.

After the printing apparatus 110 recognizes the first home position mode, the apparatus shifts the operation mode to the mode #6 as the waiting mode in a case of printing the continuous form sheets of the medium group MG1. The apparatus shifts the operation mode to the mode #10 as the waiting mode in a case of printing the single sheets of the medium group MG2.

If the continuous form sheet of the medium group MG1 is printed for one page, the printing apparatus 110 performs recognition operation of the second home position mode. At that time, the printing apparatus 110, according to, e.g., FIG. 39, is in the mode #6 for passing the perforation 300 or in the mode #5 for delivering the medium 5. The second home position mode during the printing operation for the medium group MG1 uses the slit rib 18*d* in the slit disc 18A, so that it is detected by the transmission sensor 43 during the mode #6.

To the contrary, if the single sheet of the medium group MG2 is printed for one page, the printing apparatus 110 performs confirmation operation of the second home position mode. At that time, the printing apparatus 110, according to, e.g., FIG. 40, is in the mode #14 for delivering the medium 5. The first home position mode during the printing operation for the medium group MG2 uses the slit hole 18*e* in the slit disc 18A, so that it is detected by the transmission sensor 43 during the mode #14.

As described above, in the second embodiment, in addition to the advantages from the first embodiment, the slit disc less rotates from mode shifting operation by providing the second home position mode near the mode at a printing completion time for the medium group MG1 and the medium group MG2, respectively, as another mode of the first home position mode, so that the printing apparatus can have advantages that the throughputs for printing operation are improved.

Although in the first and second embodiments, this invention applies to the dot impact printers of serial type, this invention is applicable to other printing apparatus of such as, e.g., thermal types or inkjet types using medium conveyance operation. The mode as a state of the printing apparatus can be recognized by reading a signal from the slit disc using a sensor or the like as the mode detecting means, and can shift the mode upon outputting the signal instructing the mode from the controller to the mode change unit.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A printing apparatus comprising:

a printing head for making printing on a medium;

a platen disposed as to face the printing head in a way selectable between being close and being remote from the printing head;

a medium conveying unit changeable of a contacting state to the medium for conveying the medium in contact with the medium along a medium conveyance route;

a shutter opening and closing the medium conveyance route;

a mode selecting unit having plural selectable modes in combination of a choice between being close to and being remote from the platen, the contacting state of the medium conveying unit to the medium, and a choice between closing and opening of the medium conveyance route by means of the shutter; and a controller controlling the mode selecting unit for selecting a prescribed mode from the plural selectable modes, wherein the mode selecting unit decides the selected mode in accordance with a position of a rotary body rotating by means of a single drive source, wherein the rotary body has a slit, and further comprising a detecting unit for detecting the rotating slit as a rotational reference position of the rotary body, wherein the mode selecting unit includes a mode change motor serving as one drive source for mode selection, a slit disc serving as the rotary body rotating by drive from the mode change motor, and a reference position mode detecting sensor serving as the detecting unit for detecting the reference position mode among the modes upon detecting a rotational position of the slit disc, and wherein the mode selecting unit classifies the types of the medium to be printed into a single sheet group and a form sheet group and selects the mode where rendering mode groups consisted of the modes correspond to the groups.

2. The printing apparatus according to claim 1, wherein the mode groups includes a reference position mode, and the mode selecting unit corrects the reference positions of the platen, a pair of medium conveyance rollers serving as the medium conveying unit, and the shutter, upon detecting the reference position mode by means of the reference position mode detecting sensor at a time of the end of one page printing.

3. The printing apparatus according to claim 2, wherein the modes are shifted by switching any of the platen's state of being close or remote, the medium conveyance roller pair's state of contacting or not contacting as well as being strong or weak in contacting force, and the shutter's state of closing or opening the conveyance route, wherein the medium conveyance roller pair's state of contacting has two states; a first contacting state and a second contacting state, the contacting force in the first contacting state is weaker than the contacting force in the second contacting state, and wherein the reference position mode is an intermediate state during shifting among the entire modes.

4. The printing apparatus according to claim 3, wherein the reference position mode is set as a first reference position mode, wherein the mode group includes a second reference position mode in addition to the first reference position mode, wherein the second reference position mode is a mode near a mode at a time of the end of printing among the shifting of the modes with respect to the groups, and wherein the mode selecting unit selects the second reference position mode in accordance with the type of the medium.

5. The printing apparatus according to claim 4, wherein the controller has a function outputting to the mode selecting unit a signal instructing a mode to be shifted based on the reference position mode detected with the reference position mode detecting sensor.

* * * * *